(12) United States Patent
Jalali et al.

(10) Patent No.: US 12,465,280 B1
(45) Date of Patent: Nov. 11, 2025

(54) SYSTEM AND METHODS FOR GAIT ANALYSIS AND LONGITUDINAL HEALTH AND AGING ASSESSMENTS INCLUDING MUSCULOSKELETAL DISORDERS USING VIDEO-TRAINED SPATIO-TEMPORAL GRAPH NEURAL NETWORKS

(71) Applicant: iMagine Design LLC, Tuscon, AZ (US)

(72) Inventors: Bahram Jalali, Los Angeles, CA (US); William R Ryan, Los Angeles, CA (US)

(73) Assignee: iMagine Design LLC, Tuscon, AZ (US)

( * ) Notice: Subject to any disclaimer, the term of this patent is extended or adjusted under 35 U.S.C. 154(b) by 0 days.

(21) Appl. No.: 19/230,571

(22) Filed: Jun. 6, 2025

(51) Int. Cl.
  *A61B 5/00* (2006.01)
  *A61B 5/11* (2006.01)
  *A61B 5/256* (2021.01)
  *A61B 5/389* (2021.01)

(52) U.S. Cl.
  CPC ............ *A61B 5/4528* (2013.01); *A61B 5/112* (2013.01); *A61B 5/1128* (2013.01); *A61B 5/256* (2021.01); *A61B 5/389* (2021.01); *A61B 5/7267* (2013.01); *A61B 5/7275* (2013.01)

(58) Field of Classification Search
  CPC ..... A61B 5/4528; A61B 5/112; A61B 5/1128; A61B 5/256; A61B 5/389; A61B 5/7267; A61B 5/7275
  See application file for complete search history.

(56) References Cited

U.S. PATENT DOCUMENTS

2021/0232810 A1* 7/2021 Parsa ...................... G06N 3/08

OTHER PUBLICATIONS

Lovanshi, M, & Tiwari, V. (2023). Human skeleton pose and spatio-temporal feature-based activity recognition using ST-GCN. Multimedia Tools and Applications, 83, 12705-12730. (Year: 2023).*

(Continued)

*Primary Examiner* — Eric F Winakur
*Assistant Examiner* — Hy Khanh Doan

(57) ABSTRACT

A method for pose and gait classification and motion prediction using spatio-temporal relationships between body joints includes capturing a sequence of images or video frames of a subject; applying a neural network-based pose estimation algorithm to the sequence of images or video frames to detect landmark positions of anatomical joints; constructing a spatio-temporal graph from the detected landmark positions of the one or more anatomical joints, wherein nodes of the spatio-temporal graph correspond to the anatomical joints and the landmark positions, spatial edges of the spatio-temporal graph represent anatomical connections between the anatomical joints within a single image or frame, and temporal edges connect the one or more anatomical joints across successive images or frames of the sequence of images or video frames; and inputting the constructed spatio-temporal graph into a spatio-temporal graph convolutional network (ST-GCN) to classify pose and gait patterns and predict motion or stability states.

19 Claims, 12 Drawing Sheets

Video Data
105

Graph
110

Spatiotemporal Graph Neural Network (ST-GNN)
115

(56) References Cited

OTHER PUBLICATIONS

Tian, H., Ma, X., Wu, H., & Li, Y. (2022). Skeleton-based abnormal gait recognition with spatio-temporal attention enhanced gait-structural graph convolutional networks. Neurocomputing, 473, 116â126. (Year: 2022).*

Zhong, J., Ye, C., Cao, W. et al. (2024). Parallel multi-stage rectification networks for 3D skeleton-based motion prediction. Sci Rep 14, 26058. (Year: 2024).*

* cited by examiner

331 — ST-GNN created in steps 220 and/or 225 may be initially trained or currently trained based on images and video sequences and/or sensor data from an athlete and/or a healthy individual and resulting spatio-temporal graphs 332 — The posture, gait or motion classification module 277 may generate pose parameters, gait parameters, motions parameters or measurements for the athlete or health individual 333 — Scoring module 385 may compare the posture, gait or motion classification module 277 may generate pose parameters, gait parameters, motion parameters or measurements for the athlete or health individual generated in step 325 from a current patient or subject to the healthy person or athlete's pose parameters, gait parameters, motion parameters and/or measurement generated in step 333 to identify or detect movement deficits of a current subject or patient 334 — ST-GNN or ST-GCN and/or its personal gait model may be integrated with an exoskeleton for movement assistance or rehabilitation. In exemplary embodiments, the ST-GNN or ST-GCN may be configured to predict or detect potential risks of instability and predict falls. In these embodiments, an exoskeleton may assist a patient or subject in maintaining balance and/or movement assistance. In exemplary embodiments, the exoskeleton may utilize information and/or measurements from the personal gait model to preemptively modify torque or joint stiffness parameters, thereby mitigating a likelihood of falls

FIG. 3C

FIG. 8 (Digital Physical Therapy System)

SYSTEM AND METHODS FOR GAIT ANALYSIS AND LONGITUDINAL HEALTH AND AGING ASSESSMENTS INCLUDING MUSCULOSKELETAL DISORDERS USING VIDEO-TRAINED SPATIO-TEMPORAL GRAPH NEURAL NETWORKS

BACKGROUND

In physical therapy, examining a patient's gait and pose is a fundamental aspect of assessment and treatment. Accurate gait analysis plays a critical role in a wide range of applications, including physical rehabilitation, fall prevention, biometric identification, sports performance monitoring, and aging assessments. Traditional gait assessment methods often rely on visual observation, force plates, or wearable sensors. While these methods offer valuable information, they are limited in several important ways.

Visual observation is inherently subjective and lacks quantitative rigor. Wearable sensors, while objective, can be intrusive, require precise placement, and may not fully capture the spatial and temporal relationships among body joints. Additionally, many existing systems analyze movement data as independent signals from each sensor or joint, failing to account for the complex biomechanical dependencies between joints that define coordinated human motion. Recent advances in computer vision and machine learning, particularly neural network-based pose estimation, have enabled the extraction of human joint landmarks directly from video data. Algorithms such as Google MediaPipe and OpenPose provide reliable frame-by-frame estimates of body joint positions. However, these estimates are typically processed as flat time series, with little to no integration of the spatial structure of the human skeleton or its evolution over time.

What is needed is a digital system that allows a physical therapist or a medical professional to utilize a system make an automated diagnosis of musculoskeletal issues and also allow a longitudinal assessment of subject's progression for physical therapy and sports medicine.

BRIEF DESCRIPTION OF THE DRAWINGS

A better understanding of the features, advantages and principles of the present disclosure will be obtained by reference to the following detailed description that sets forth illustrative embodiments, and the accompanying drawings of which:

FIG. 3C illustrates additional steps in a flowchart to utilize the ST-GNNs or ST-GCNs in improving analysis of a patient during therapy or exercise sessions according to exemplary embodiments;

DETAILED DESCRIPTION

Figure 1:
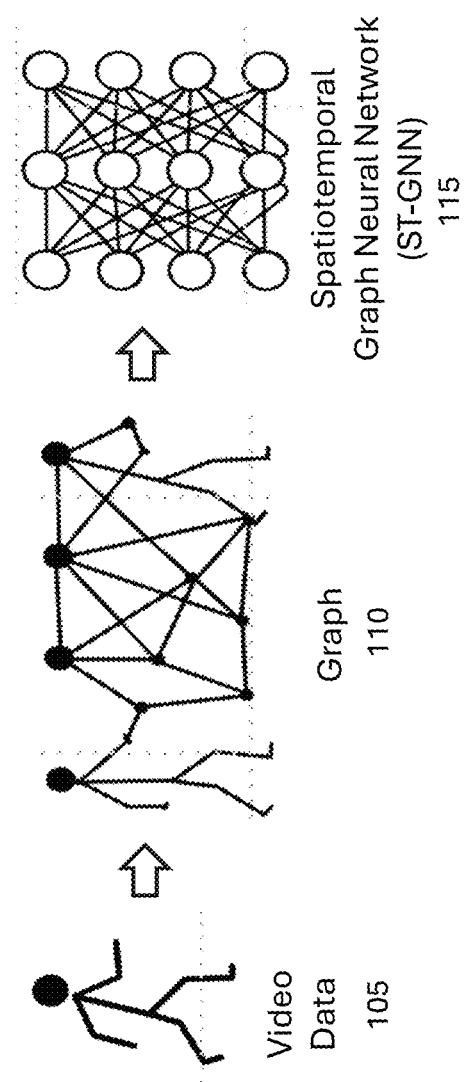
FIG. 1 illustrates a high-level view of a method of pose and gait recognition using video data according to exemplary embodiments.

The following detailed description and provides a better understanding of the features and advantages of the inventions described in the present disclosure in accordance with the embodiments disclosed herein. Although the detailed description includes many specific embodiments, these are provided by way of example only and should not be construed as limiting the scope of the inventions disclosed herein.

The present subject matter relates to intelligent and automated systems and methods for gait analysis and longitudinal health and aging assessments including musculoskeletal disorders using video-trained spatiotemporal graph neural networks.

The components of the basic system include a plurality of cameras configured to capture videos of the patient's body and in some cases specific body parts and then to analyze the sequence of videos or images either alone or combined. This is combined with machine learning algorithms and spatio-temporal graph neural networks that analyze the captured videos to measure motion and posture and to quantify gait metrics.

Spatio-temporal Graph neural networks (ST-GNNs), and specifically spatio-temporal graph convolutional networks (ST-GCNs), have emerged as powerful tools for modeling structured data that evolves over time. Note that ST-GNN and ST-GCNs may be used interchangeably in these applications. Patient and/or subject may also be utilized interchangeably throughout the application. ST-GCNs are high performing ST-GNNs.

In exemplary embodiments, ST-GNNs may be used to represent a patient's body as a dynamic graph of joints (nodes) and bones (edges), capturing both spatial connectivity and temporal dynamics. In exemplary embodiments, there is a need for practical systems that effectively train such ST-GNNs on video-based pose, motion and gait data, parameters and measurements and apply these ST-GNNs to clinical and real-world settings.

Furthermore, current gait recognition models typically focus on classification tasks and lack mechanisms for personalized longitudinal analysis, such as tracking recovery after surgery, identifying age-related decline, or comparing individuals to normative gait baselines. There is also limited support for real-time feedback or for generating digital gait twins that could serve as references for rehabilitation or performance evaluation for patients.

Decomposing video data into space and time dimensions is a powerful method to obtain the spatio-temporal relations in the data by combining standard graph neural network (GNNs) with temporal blocks in a machine learning model. For the temporal block, tools from time series forecasting as well as neural network techniques such as temporal convolutions or attentions networks are very effective in learning over image or video sequences.

Using attributed graphs in the context of spatio-temporal gait analysis enables the model to capture the non-stationarity and non-static nature of human motion-key to understanding individualized gait, changes over time, and deviations due to injury, aging, or recovery.

In exemplary embodiments, such attributed GNNs can improve gait classification accuracy by capturing both the within-session variation (such as fatigue) and across-session evolution such as therapy progress and aging. They also capture deviations from a digital twin created at a particular point in time. In an attributed graph, each node (joint or body landmark) and each edge (bone connection or temporal link) can carry additional features (attributes) where these attributes provide richer information beyond the graph topology.

In the context of physical therapy, the human skeleton graph evolves over time. For example, the graph is non-static because nodes (joints) move, and their relative positions change across frames. Also, the motion is non-stationary because different phases of a gait cycle (stance, swing) or transitions (e.g., from walking to standing) show different dynamics In exemplary embodiments, the systems and methods described herein modify the GNN input to include feature vectors per node and edge instead of identifying connectivity. In exemplary embodiments, the systems and methods described herein may use attention or gated convolutions to dynamically weigh important attributes at different time steps. In exemplary embodiments, the systems and methods described herein may perform temporal encoding such as positional embeddings (plus time-index features) to represent time explicitly.

In exemplary embodiments, the system and methods described herein may train spatial-temporal graph neural networks using video-derived pose data, accurately classify gait and motion states, predict fall risk and stability changes, allow longitudinal comparisons of a subject's or patient's gait over time, and support applications in rehabilitation, aging analysis, and/or personalized health monitoring. In exemplary embodiments, the system and methods described herein introduces a video-based training pipeline for spatial-temporal graph neural networks and a comprehensive framework for gait analysis, fall prediction, and/or health trajectory assessment.

In exemplary embodiments, a system and method is described herein for pose and gait recognition, motion prediction and patient scoring using spatio-temporal graph neural networks (ST-GNNs) derived from video data. In exemplary embodiments, the system and method may capture images or video frames of a subject utilizing one or more imaging devices or cameras, apply a neural network-based pose estimation algorithm to detect anatomical landmarks or landmark positions in captured images or video frames, and construct a spatio-temporal graph where nodes represent joints and edges represent anatomical and temporal connections. In exemplary embodiments, the spatio-temporal graph may be input into a spatio-temporal graph convolutional network (ST-GCN) or a ST-GNN that learns joint dependencies and classifies motion patterns. In some implementations, optional enhancements include may spatial and temporal attention mechanisms, and integration of data from inertial measurement units (IMUs) and/or surface electromyography (EMG) sensors (and potentially other sensors).

In exemplary embodiments, the subject matter described herein further comprises a dual-time-scale stratified spatio-temporal graph neural network with a fast time-scale and a slow time-scale where the fast time scale may capture intra-session temporal patterns by learning from image or video frame sequences within a single exercise or examination session, and the slow time scale captures inter-session temporal patterns by learning from pose or gait data across multiple longitudinal exercise or examination sessions. In other words, the steps describe above in creating the initial fast-time scale ST-GNN for an initial exercise or therapy sessions may be repeated for a number of exercise or therapy sessions that occur over time.

In exemplary embodiments, a system and method described herein includes trained models that are used for gait classification, rehabilitation planning fall prediction, real-time feedback during rehabilitation or training, biometric identification, and/or longitudinal health assessments. In some implementations, neural networks or trained models described herein have applications in physical therapy, orthopedics, sports medicine, and/or creation of personalized digital gait models. Additional utilities of the system and methods described herein encompass a scoring and benchmarking of aging and frailty against patient's past states, scoring and benchmarking against a broader population, and predictions of future musculoskeletal disorders and recommendation of interventional therapy.

FIG. 1 illustrates a high-level view of a method of pose and gait recognition using video data according to exemplary embodiments. In exemplary embodiments, a system and method for pose and gait recognition, motion prediction and patient scoring using spatio-temporal graph neural networks (GNNs) from video or image data is shown. In exemplary embodiments, the system or method may capture images or video frames 105 of a subject or patient performing movements during an exercise or therapy session. In exemplary embodiments, the system or method may apply a neural network-based pose estimation algorithm to detect anatomical landmarks and constructs or generates a spatio-temporal graph 110 where nodes of the graph may represent a patient's or subject's joints and edges may represent anatomical and/or temporal connections. In exemplary embodiments, the spatial-temporal graph may be input into a spatial-temporal graph neural network (ST-GNN) 115. In exemplary embodiments, the ST-GNN may be a spatial-temporal graph convolutional network (ST-GCN). These terms (ST-GNN and ST-GCN) may be utilized interchangeably. In exemplary embodiments, the ST-GNN 115 may learn joint dependencies and classifies motion patterns.

Figure 2B:
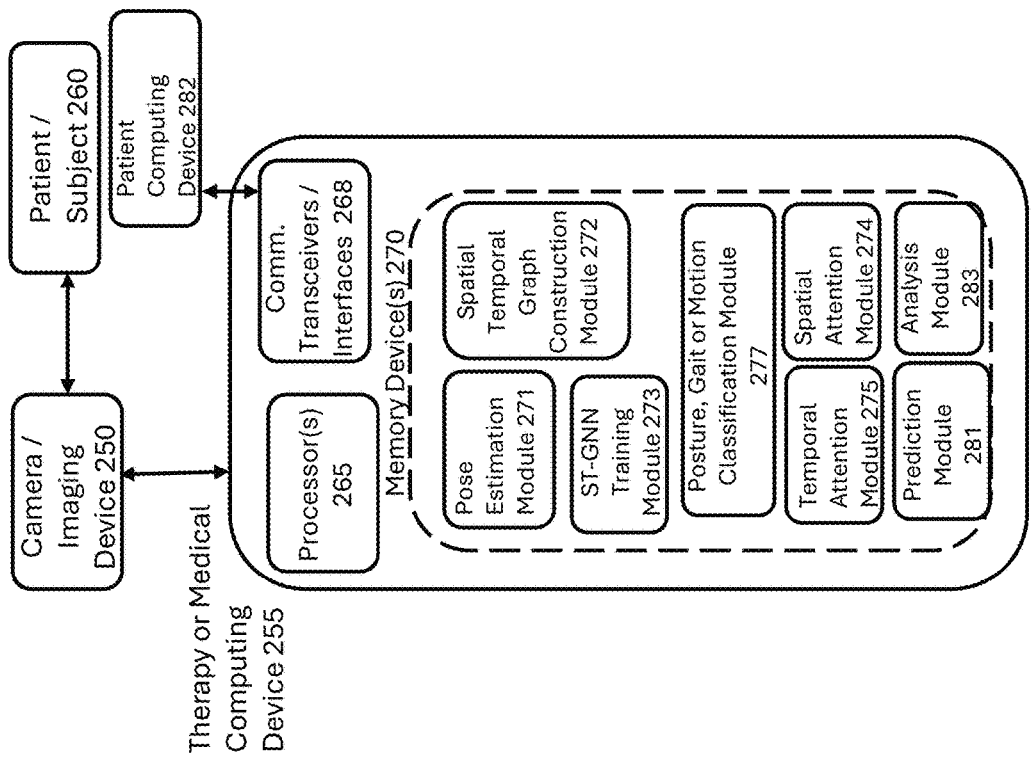
FIG. 2B illustrates a block diagram of a system for pose and gait recognition, motion prediction and patient scoring using a spatio-temporal graph neural network from video or image data according to embodiments.
Figure 2A:
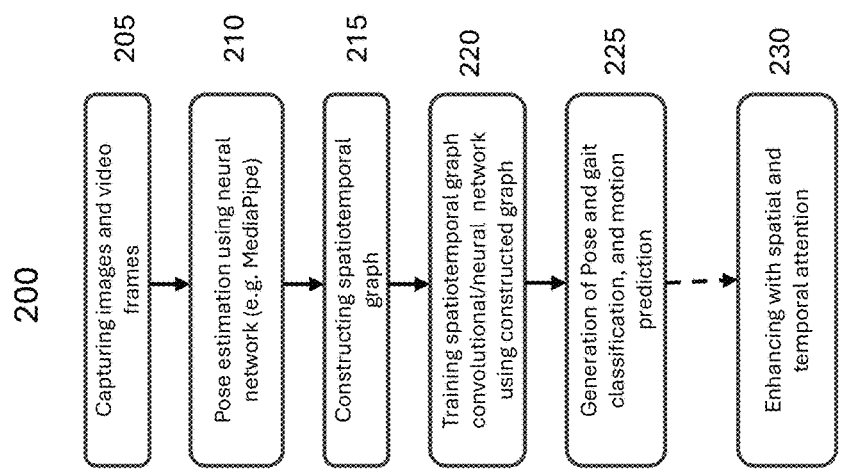
FIG. 2A illustrates a flowchart of a method for pose and gait recognition, motion prediction and patient scoring using spatio-temporal graph neural networks (GNNs) from video or image data according to embodiments.

FIG. 2A illustrates a flowchart of a method for pose and gait recognition, motion prediction and patient scoring using spatio-temporal graph neural networks (GNNs) from video or image data according to embodiments. FIG. 2B illustrates a block diagram of a system for pose and gait recognition, motion prediction and patient scoring using a spatio-temporal graph neural network from video or image data according to embodiments.

In exemplary embodiments, in step 205, one or more imaging devices or cameras 250 as shown in FIG. 2B (and described here and in FIG. 8), may capture a sequence of images or video frames of a patient or a subject 260 who is engaged in physical therapy sessions, exercise sessions or normal movements. In exemplary embodiments, the sequence of images or video frames may be captured by one or more imaging devices or cameras (e.g., in some cases there may be 2, 3, 4 or 5). In exemplary embodiments, the sequence of images or video frames are communicated or transmitted to one or more medical or therapy computing device(s) 255 by the one or more cameras or imaging devices 250 utilizing wireless communication transceivers and/or network communication transceivers 268 (if transmitted or communicated) via wired communication protocols). The sequences of video frames or images may also be referred to as video files since computing devices and/or processors may be analyzing the video frames or video files. The terms may be utilized interchangeably.

In exemplary embodiments, the one or more medical or therapy computing device(s) 255 may include one or more processors 265, one or more communication transceivers or network interfaces 268 and/or one or more memory devices 270. In exemplary embodiments, computer-readable instructions may be stored in the one or more memory devices 270 and may be executable by the one or more processors 265 to perform operations described herein. In exemplary embodiments, the computer-readable instructions may be software modules, neural networks, graph neural networks, convolutional neural networks, algorithms, programs, and/or machine learning models.

In exemplary embodiments, in step 210, computer-readable instructions executable by one or more processors 265 on the one or more medical or therapy computing device(s) 255 may be a neural network-based pose estimation algorithm 271 which may be applied to the received sequence of images or video frames (or video files) to detect and/or identify landmark positions of one or more anatomical joints of the patient or subject. In exemplary embodiments, the neural network-based pose estimation module may utilize and/or include a program such as Google Media-Pipe. In exemplary embodiments, the neural network-based pose estimation algorithm may be referred to as a pose estimation module 271. In some embodiments, a video analysis module 830 may analyze the received sequence of images or video frames. In other embodiments, additional video analysis may be performed on the sequences of images or video frames (or video files) received from the one or more cameras or imaging devices.

In exemplary embodiments, in step 215, the computer-readable instructions executable by one or more processors of the one or more therapy computing device(s) may construct a spatio-temporal graph based on the detected landmark positions of the one or more anatomical joints. In these embodiments, nodes of the constructed spatio-temporal graph may correspond to one or more anatomical joints and the associated landmark positions. In these embodiments, edges or spatial edges of the constructed spatio-temporal graph may correspond to anatomical connections between the one or more anatomical joints within a single image or frame. In these embodiments, temporal edges may connect the one or more anatomical joints across successive images or video frames of the sequence of images or video frames.

As illustrative examples, anatomical connections may be hip-to-knee, knee-to-ankle, shoulder-to-elbow, etc. In other words, each joint may a node, and bones may represent vectors between the joints and may be the edges of the graph. In exemplary embodiments, in order to encode motion of a patient or subject, temporal edges may connect a same joint across adjacent images or video frames. In these embodiments, this results in a spatial-temporal graph where nodes are joint positions at time t and edges are anatomical connections and the temporal edges identify the anatomical connections' evolution in time. In exemplary embodiments, the spatial-temporal graph construction module 272 may construct a spatial-temporal graph based on the detected landmark positions of the one or more anatomical joints.

In exemplary embodiments, in step 220, computer-readable instructions executable by one or more processors 265 of the medical or therapy computing device may utilize the constructed spatio-temporal graph and/or the sequence of images or video frames to train a spatio-temporal graph neural network (ST-GNN) to learn joint dependencies via graph convolutions and/or processing. In exemplary embodiments, a ST-GNN training module 273 may train the ST-GNN utilizing the constructed graph in order to learn joint dependencies via graph convolutions and/or processing. In some embodiments, the ST-GNN may be a spatio-temporal graph convolutional network (ST-GCN) because the ST-GCN may be a best performing neural network of ST-GNN networks. In exemplary embodiments, this produces a spatio-temporal embedding model to be used for regression, classification, and/or prediction, along with other uses. In other words, a spatial block or module can be a standard graph neural network (GNN), while the temporal block or module may be machine learning model for learning utilizing sequences of data (e.g., temporal convolution, temporal attention, etc.). In exemplary embodiments, the trained ST-GNN may further include the temporal block or module and/or the spatial block or module. In some embodiments, the ST-GNN or the ST-GCN may be trained on training video sequences labeled with corresponding gait types selected from Functional Movement Screening (FMS) tests including, but not limited to, a deep squat exercise, a hurdle step exercise, an in-line lunge exercise, a should mobility exercise, an activate straight leg raise exercise, a trunk stability push-up exercise and/or a rotary stability exercise. These exercises are representative and should not be seen as limiting.

In exemplary embodiments, in step 225, a posture, gait and motion classification module 277 may classify pose and gait patterns and predict motion or stability parameters or states for the constructed spatial-temporal graphs and generate pose parameters, gait parameters, motions parameters or measurements (e.g., and thus the nodes and edges). In exemplary embodiments, the pose and gait patterns, the motion or stability parameters, pose parameters, gait parameter, and/or motion parameters or measurements may be assigned to and/or associated with nodes and/or edges of the ST-GNN. In addition, the pose and gait patterns, the motion or stability parameters, pose parameters, gait parameter, and/or motion parameters or measurements may be stored in a database and/or memory devices of the one or more therapy or medical computing device(s). In exemplary embodiments, an output of the ST-GNN and ST-GCN may be used for biometric identification of the subjects based on the classified pose and gait patterns and parameters for the subject In exemplary embodiments, a prediction module 281 may utilize the pose and gait patterns, the motion or stability parameters, pose parameters, gait parameter, and/or motion parameters or measurements and the associated nodes and/or edges of the ST-GNN or GCN and may predict future motion states, identify abnormal gait patterns and/or to perform a fall risk assessment (FRA) for the patient or subject.

In exemplary embodiments, the system may include a computing device 282 which may be a computing device that is a patient's computing device (or a coaches or therapist's computing) 282 that is located with the patient or subject when performing an exercise. In exemplary embodiments, the computing device 282 may include a monitor or display to display video files and/or result of analysis performed. In exemplary embodiments, in step 231, the one or more medical or therapy computing device(s) 255 via the interface or transceiver 268 may communicate with the computing device 282 (through its interface) and provide real-time feedback to the patient or subject, coach and/or therapist while the patient or subject is undergoing physical therapy or athletic training. In exemplary embodiments, the real-time feedback may be based at least in part on the classified pose and gait patterns, parameters or measurements or the predictor motion measurements states generated by the posture, gait or motion classification module 277 and the ST-GNN.

In exemplary embodiments, in step 230, a spatial attention module 274 of the ST-GNN or ST-GCN may focus or add attention or focus to certain joints of the patient or subject. Alternatively, or in addition to, a temporal attention module 275 of the ST-GNN or ST-GCN may focus or have attention directed critical timeframes of the exercise or therapy session. As an example, if the patient or subject's knee was previously injured, a spatial attention module 274 may generate additional pose, motion or stability parameters to verify the knee is moving in a healthy manner during exercise or therapy routines. As an example, if a patient or subject has a hard time maintaining fitness after a certain period of time, a temporal attention module may emphasize pose and gait patterns (or motion or stability) for the last ten minutes of the exercise or therapy routines. This allows the system and method described herein to adapt to unique patient or subject conditions in order to obtain the most accurate data and information and/or add this information to nodes and edges of the ST-GNN or ST-GCN. In exemplary embodiments, the method steps described in FIG. 2A may be repeated for each exercise or therapy session completed by the patient or subject, which may be on different days, weeks, months or years and unique spatio-terminal graphs and unique ST-GNNs or ST-GCNs may be generated or created for each of the exercise or therapy sessions. In exemplary embodiments, the sequences of videos and/or images, the video or image files, the landmark positions, constructed spatio-temporal graphs, the ST-GNN or ST-GCN, any patterns, parameters and measurements generated during the steps of FIG. 2A, may be stored in one or more memory devices 270 of the one or more medical or therapy computing device(s), which could include a neural network database.

Figure 2C:
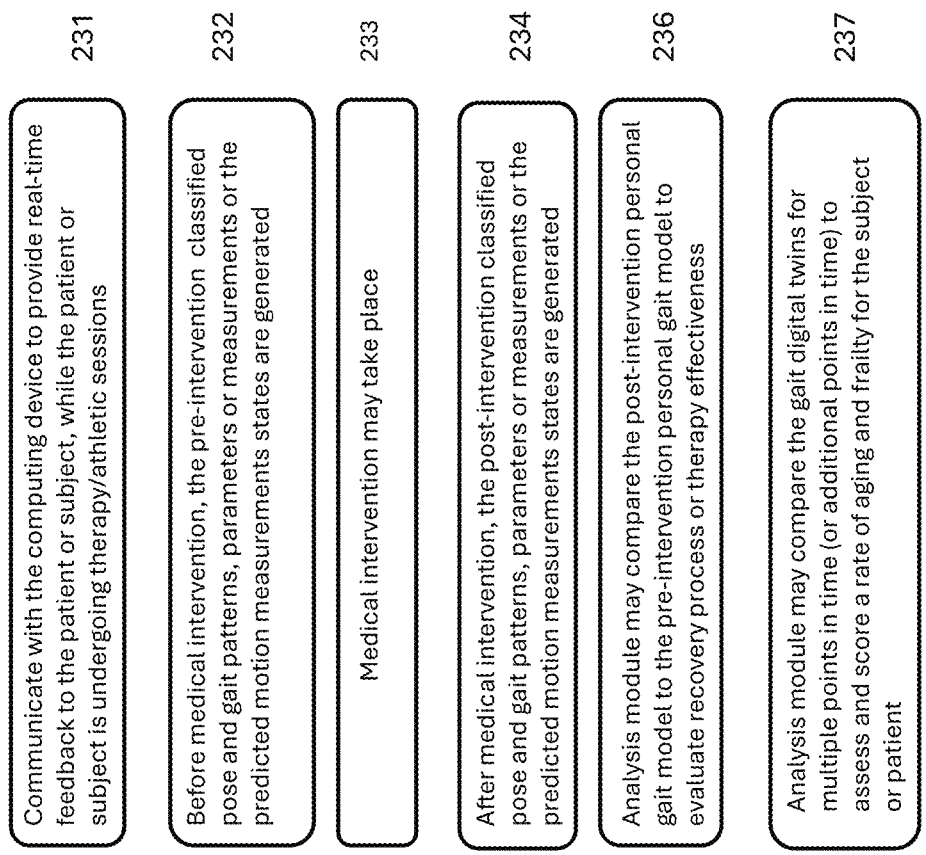
FIG. 2C illustrates additional steps in a flowchart to utilize the ST-GNNs or ST-GCNs in improving analysis of a patient during therapy or exercise sessions according to exemplary embodiments.

FIG. 2C illustrates additional steps in a flowchart to utilize the ST-GNNs or ST-GCNs in improving analysis of a patient during therapy or exercise sessions according to exemplary embodiments. In exemplary embodiments, the system or method describe herein allows a digital twin to be generated and digitally represent the patient or subject when the patient or subject is performing the exercise or therapy session. This allows comparison to prior versions of the digital twin to make comparisons to at prior or future points in time. In exemplary embodiments, for example, a patient or subject may have utilized the system and method described herein before a medical intervention has taken place. In exemplary embodiments, in step 232, before a medical intervention, the classified pose and gait patterns, parameters or measurements or the predicted motion measurements states generated by the posture, gait or motion classification module 277 may be generated or calculated and this may be referred to as pre-intervention classified pose and gait parameters and predicted motion measurements states. In exemplary embodiments, in step 233, the medical intervention may take place. In exemplary embodiments, pre-intervention classified pose and gait parameters and predicted motion measurements states may be stored in the one or more memory devices 270 of the one or more medical or therapy computing devices 255. In exemplary embodiments, in step 234, the subject or patient may perform movements in a therapy or exercise session post medical intervention and steps 205 to 225 may be performed and post-intervention classified pose and gait parameters and predicted motion measurements or states may be generated by the posture, gait or motion classification module 277. In exemplary embodiments, the pre-intervention and post-intervention classified pose and gait parameters and predicted motion measurements or states may be referred to pre-intervention personal gait model and a post-intervention personal gait model. In exemplary embodiments, in step 235, an analysis module 283 may compare the post-intervention personal gait model to the pre-intervention personal gait model to evaluate recovery process or therapy effectiveness and/or also to assist in rehabilitation planning for the patient or subject. In exemplary embodiments, the patient or subject may perform movements in multiple therapy or exercise sessions and each time a personal gait model may be generated for each of the multiple therapy or exercise sessions (which may be referred to as gait digital twins). In other words, there may be a number of additional digital twins. In exemplary embodiments, in step 236, an analysis module 283 may compare the gait digital twins for multiple points in time (or additional points in time) to assess and score a rate of aging and frailty for the subject or patient. In exemplary embodiments, the analysis module may store the aging and frailty score for the patient or subject in one or more memory devices 270 of the one or more medical or therapy computing devices.

Figure 3A:
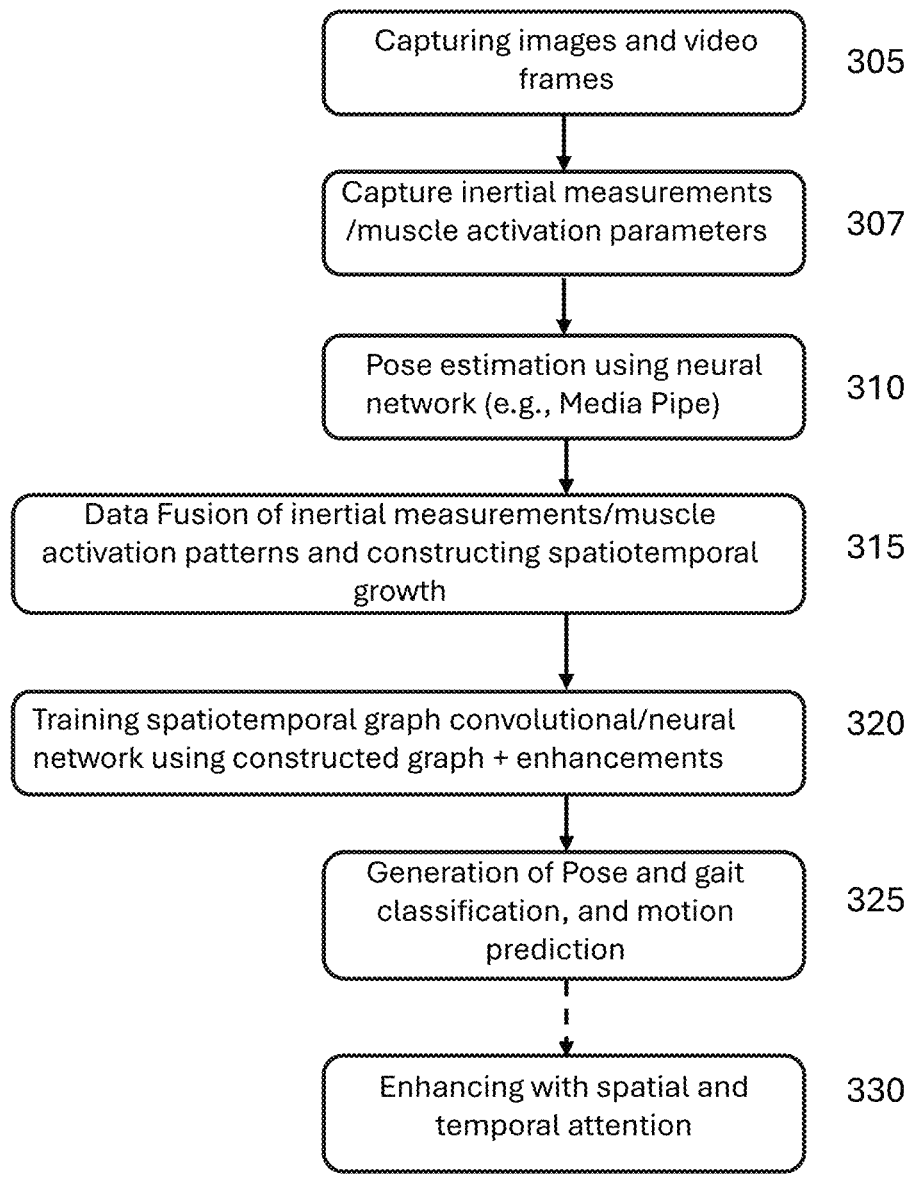
FIG. 3A illustrates a flowchart of a method for pose and gait recognition, motion prediction and patient scoring using spatio-temporal graph neural networks (GNNs) from video or image data and fusing in inertial data and muscle activation parameters according to embodiments.
Figure 3B:
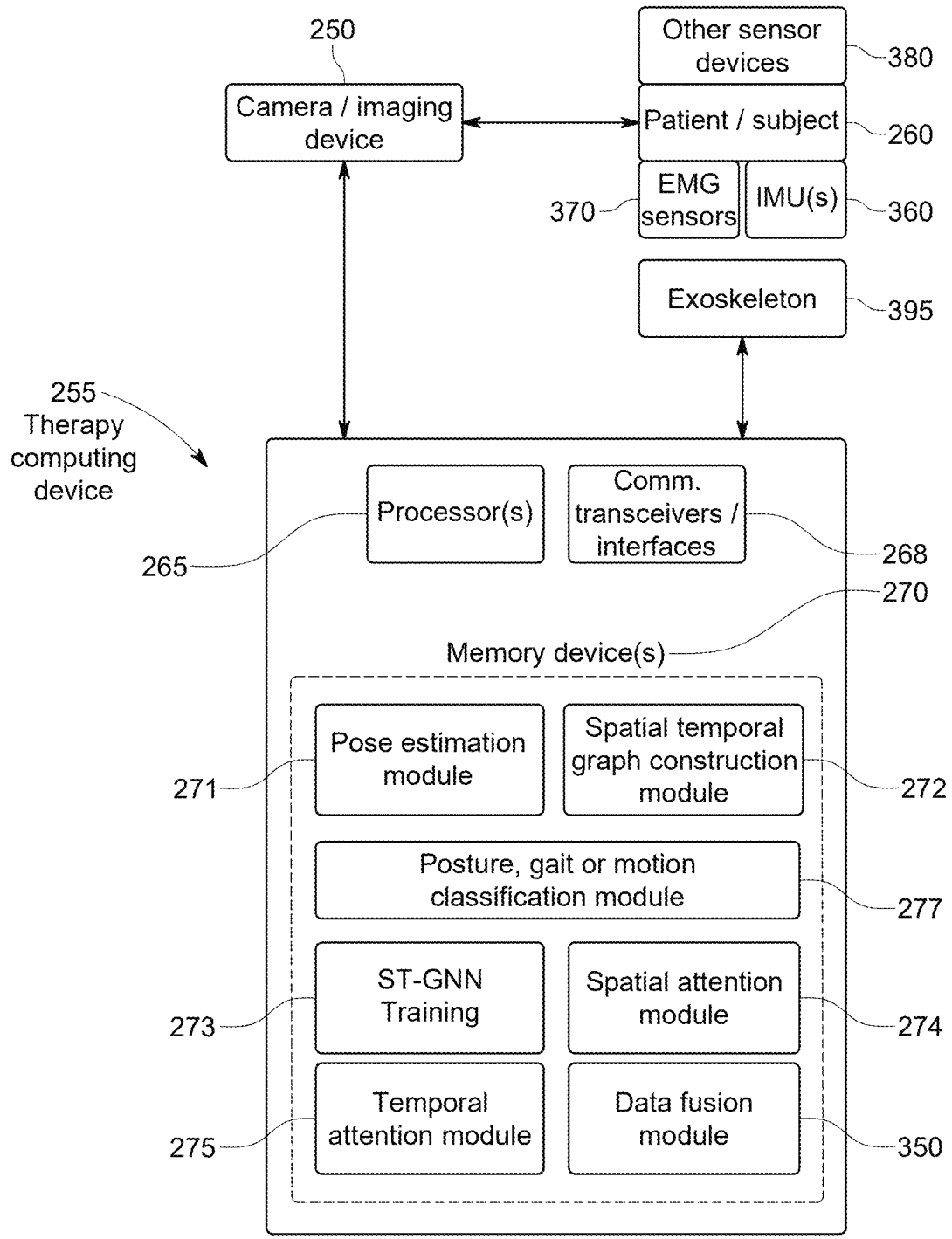
FIG. 3B illustrates a block diagram of a system for pose and gait recognition, motion prediction and patient scoring using a spatio-temporal graph neural network from video or image data and fusing in inertial data and muscle activation parameters according to embodiments.

FIG. 3A illustrates a flowchart of a method for pose and gait recognition, motion prediction and patient scoring using spatio-temporal graph neural networks (GNNs) from video or image data and fusing in inertial data and muscle activation parameters according to embodiments. FIG. 3B illustrates a block diagram of a system for pose and gait recognition, motion prediction and patient scoring using a spatio-temporal graph neural network from video or image data or files and fusing in inertial data or parameters and muscle activation parameters according to embodiments. In FIGS. 3A and 3B, most of the steps in the flowchart and module or devices are the same as in FIGS. 2A and 2B, except in FIGS. 3A and 3B, the exemplary embodiments includes inertial measurement units (IMUs) 360, surface electro-myography (EMG) sensors 370 and other devices or sensors 380 along with including a data fusion module 350 for supplementing the image or video data or files with inertial measurements and parameters, muscle activation parameters or patterns, and/or other sensor parameters or measurements. Further, use of a exoskeleton 395 is described. In FIG. 3A, step 305 is the same as step 205. In exemplary embodiments, in step 307, one or more inertial measurement units (IMUs) 360 may capture or generate inertial measurements of the patient or subject during therapy or exercise sessions and may communicate the captured inertial measurements to the one or more medical or therapy computing device(s) 255. In addition, one or more EMG sensors 370 may capture muscle activation patterns of the patient or subject during exercise or therapy sessions and may communicate the captured muscle activation patterns to the one or more medical or therapy computing device(s) 255. In some embodiments, the muscle activation parameters may be electrical signals. In exemplary embodiments, one or more EMG sensors 370 may be connected to a conversion device which takes the electrical signals from the EMG sensors and converts the EMG sensor electrical signals into muscle activation parameters. In exemplary embodiments, the muscle activation parameters may be received by the one or more medical or therapy computing device(s) 255. This may occur at the one or more EMG sensors 370 and/or the medical or therapy computing device 255 and/or at other computing devices. In some embodiments, other sensors 380 attached to or coupled to the patient or subject may capture physiological parameters of the patient or subject during the exercise or therapy sessions. In these embodiments, the sensors 380 may communicate the physiological parameters to the one or more medical or therapy computing device(s) 255. In exemplary embodiments, the other sensors 380 may be pressure pads (generating balance parameters) and/or pulse oximetry sensors or electrocardiogram (EKG) sensors (generating heart rate measurements, blood oxygen levels, $CO_2$ levels, heart rate and/or electrocardiograms or electrocardiographs (which may be converted from electrical signals into parameters or measurements)).

In exemplary embodiments, step 310 operates in a similar fashion as step 210 and will not be discussed further. In exemplary embodiments, in step 315, the computer-readable instructions executable by one or more processors 265 of the one or more medical or therapy computing device(s) 255 may construct a spatial-temporal graph based on the detected landmark positions of the one or more anatomical joints and may enhance or add to nodes of the spatial-temporal graph. This provides additional information about the patient or subject that may also be utilized by the spatial-temporal graphical neural network. Also, in exemplary embodiments, additional information and parameters may be included in attributed nodes and attributed edges of the spatial-temporal graphical neural network (ST-GNN) and provide more complexity and teaching to the ST-GNN. In exemplary embodiments, the attributed nodes of the ST-GNN may include one or more time-dependent attributes including, but not limited to, joint coordinates, IMU data or parameters (joint velocity, joint acceleration, joint angles) and surface electromyography (EMG) signals or muscle activation parameters. In exemplary embodiments, each attributed edge may include one or more attributes including but not limited to inter-joint distances, bone orientation vectors, relative angles, joint displacement across frames, and biomechanical symmetry metrics. In exemplary embodiments, the attributed nodes and edges may vary over time and represent a non-static and non-stationary nature of human gait, allowing or enabling the ST-GNN (or ST-GCN) to learn short-term kinematic changes and/or long-term biomechanical trends. In exemplary embodiments, the data fusion module 350 may assist the spatio-temporal graph construction module 272 and/or the ST-GNN training module 273 in adding the data and/or information (e.g., 3D movement parameters, muscle activation parameters, and/or physiological parameters or measurements) from the IMUs 360, the EMG sensors 370, and/or the other sensors 380.

In exemplary embodiments, in step 320, computer-readable instructions executable by one or more processors 265 of the medical or therapy computing device(s) may utilize the constructed spatio-temporal graph and/or the sequence of images or video frames to train a spatio-temporal graph neural network (ST-GNN) to learn joint dependencies via graph convolutions and/or processing. In addition, in step 320, the spatio-temporal graph neural network (ST-GNN) may also include and/or integrate the enhanced data and measurements (e.g., 3D movement parameters, muscle activation parameters, and/or physiological parameters or measurements) captured from the IMUs 360, the EMG sensors 370, and/or the other sensors 380.

In exemplary embodiments, in step 325, a posture, gait and motion classification module 277 may classify pose and gait patterns and predict motion or stability parameters or states for the constructed spatial-temporal graphs and generate pose parameters, gait parameters, motions parameters or measurements (e.g., and thus the nodes and edges). In exemplary embodiments, in step 330, a spatial attention module 274 of the ST-GNN or ST-GCN 273 may focus or add attention or focus to certain joints of the patient or subject. Alternatively, or in addition to, a temporal attention module 275 of the ST-GNN or ST-GCN 273 may focus or have attention directed critical timeframes of the exercise or therapy session. As an example, if the patient or subject's knee was previously injured, a spatial attention module 274 may generate additional pose, motion or stability parameters to verify the knee is moving in a healthy manner during exercise or therapy routines.

FIG. 3C illustrates additional steps in a flowchart to utilize the ST-GNNs or ST-GCNs in improving analysis of a patient during therapy or exercise sessions according to exemplary embodiments. In exemplary embodiments, the system and method described herein may be utilize measurements and/or parameters from healthy or athletic individuals as benchmarks in order to identify where a patient or subject is as compared to healthy and/or athletic individuals. In exemplary embodiments, in step 331, the ST-GNN created in steps 220 and/or 225 may be initially trained or currently trained based on images and video sequences and/or sensor data from an athlete and/or a healthy individual and resulting spatio-temporal graphs. In exemplary embodiments, in step 332, the posture, gait or motion classification module 277 may generate pose parameters, gait parameters, motions parameters or measurements for the athlete or health individual. In exemplary embodiments, in step 333, a scoring module 385 may compare the posture, gait or motion classification module 277 may generate pose parameters, gait parameters, motion parameters or measurements for the athlete or health individual generated in step 325 from a current patient or subject to the healthy person or athlete's pose parameters, gait parameters, motion parameters and/or measurement generated in step 333 to identify or detect movement deficits of a current subject or patient. In exemplary embodiments, the movement deficits may be limited range of motion, poor stability, or asymmetries, that may hinder performance or increase injury risk for the current patient or subject. In exemplary embodiments, these movement deficits may be useful in rehabilitation planning for the patient or subject over a number of therapy or exercise sessions.

FIG. 3C also illustrates a ST-GNN interfacing with an exoskeleton device 395 according to exemplary embodiments. In exemplary embodiments, in step 334, the ST-GNN or ST-GCN and/or its personal gait model may be integrated with an exoskeleton for movement assistance or rehabilitation. In exemplary embodiments, the ST-GNN or ST-GCN may be configured to predict or detect potential risks of instability and predict falls. In these embodiments, an exoskeleton device 395 may assist a patient or subject in maintaining balance and/or movement assistance. In exemplary embodiments, the exoskeleton may utilize information and/or measurements from the personal gait model in the one or more medical or therapy computing device(s) 255 to preemptively modify torque or joint stiffness parameters, thereby mitigating a likelihood of falls In other use cases, the ST-GNN may be trained using patient or subject data to encode specific gait patterns and mobility impairments and this may allow generation of tailed exoskeleton control policies and/or parameters that align with a patient's unique biomechanical requirement, which can be communicated to the exoskeleton device. In exemplary embodiments, the ST-GNN may be combined with reinforcement learning (RL). RL is a branch of machine learning that focuses on how agents can learn to make decisions through trial and error to maximize cumulative rewards. RL allows machines to learn by interacting with an environment and receiving feedback based on their actions. In other exemplary embodiments, the ST-GNN may be iteratively trained which results in iterative improvement through continuous data acquisition from the one or more imaging devices or cameras 250, and/or optionally inertial measurement units 360 and/or EMG sensors 370. In exemplary embodiments, based on the acquired data, the ST-GNN may undergo retraining or fine-turning to align with the patient's or subject's biomechanics. In exemplary embodiments, the one or more medical or therapy computing devices may communicate retained model parameters with the exoskeleton device 395 so that the exoskeleton device may dynamically adapt its control parameters. In exemplary embodiments, the exoskeleton device 395 and/or the continuously trained GT-STT(s) may establish a closed-loop adaptive framework that ensures optimization of the system performance in working with the exoskeleton as a response to patient performance. In exemplary embodiments, the exoskeleton device 395 may be attached to the patient or subject 260 and/or especially to joints of the patient or subject 260. It may be a biomechanical and/or electrical device that supplies commands to a brain of the subject or patient in order for specific actions to occur and for biomechanics of the patient or subject to be adjusted. It can provide a patient or subject 260 with guidance on correct movements to make. In other words, an exoskeleton is wearable device that augments, enables, assists, or enhances motion, posture, or physical activity through mechanical interaction with and force applied to the user's body. The exoskeleton receives control parameters with respect to movements the patient or subject 260 should take.

Figure 4:
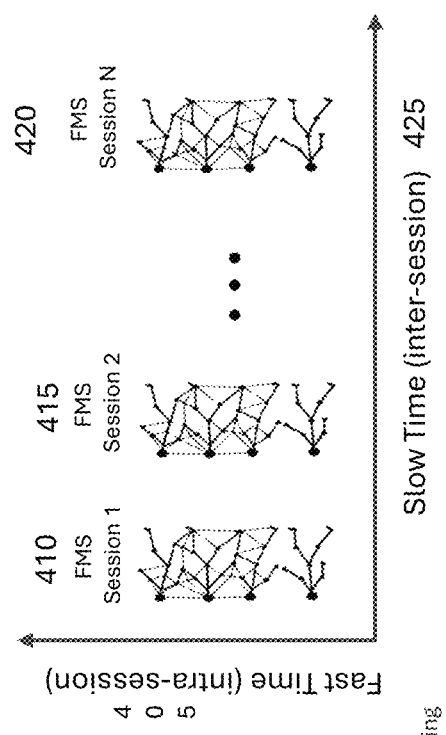
FIG. 4 is a graph illustrating a stratified ST-GNN according to exemplary embodiments.

FIG. 4 is a graph illustrating a stratified ST-GNN according to exemplary embodiments. In exemplary embodiments, the stratified ST-GNN includes a fast time scale ST-GNN 405 and a slow time scale ST-GNN 425. In exemplary embodiments, the fast time scale ST-GNN 405 may include intra-session temporal patterns that are generated or created by learning from image or video frame sequences within a single examination, therapy or exercise session. As an illustrative example, a single examination session may be a functional movement screening (FMS) which may include, but not be limited to walking, jumping, squatting, standing on one foot, hopping and/or running. A representative fast scale ST-GNN 410 is shown in FIG. 4. Other fast scale ST-GNNs include ST-GNNs 415 and 420 that include intra-session temporal patterns generated or created by learning from image or video frame sequences for second and third single examination sessions occurring at second and third times.

In exemplary embodiments, a slow time scale ST-GNN 425 may capture inter-session temporal patterns by learning from pose or gait data across multiple longitudinal examination sessions (e.g., examinations at a first time, a second time, a third time, etc.), such that the trained slow time scale ST-GNN model 425 may encode both short-term kinematic dynamics and long-term functional or aging-related changes in gait, including comparisons before and after surgery, across therapy milestones, or throughout the subject's lifespan. In other words, a slow time scale ST-GNN may encompass a much longer time scale spanning weeks, months or years. In some embodiments, the slow time scale GNN 425 may span multiple physical therapy sessions during the course of a rehabilitation treatment. In FIG. 4, the slow time scale ST-GNN 425 is represented by all of the fast time scale ST-GNNs 410, 415 and 420 (and up to N fast time scale ST-GNNs) generated by the FMS studies and encompasses and is trained by all of the results. In exemplary embodiments, a powerful stratified ST-GNN architecture leverages multiple Spatio-temporal Graph Neural Networks (ST-GNNs) or ST-GCNs to model complex temporal dynamics across different scales (e.g., subjects and/or timeframes).

Figure 5:
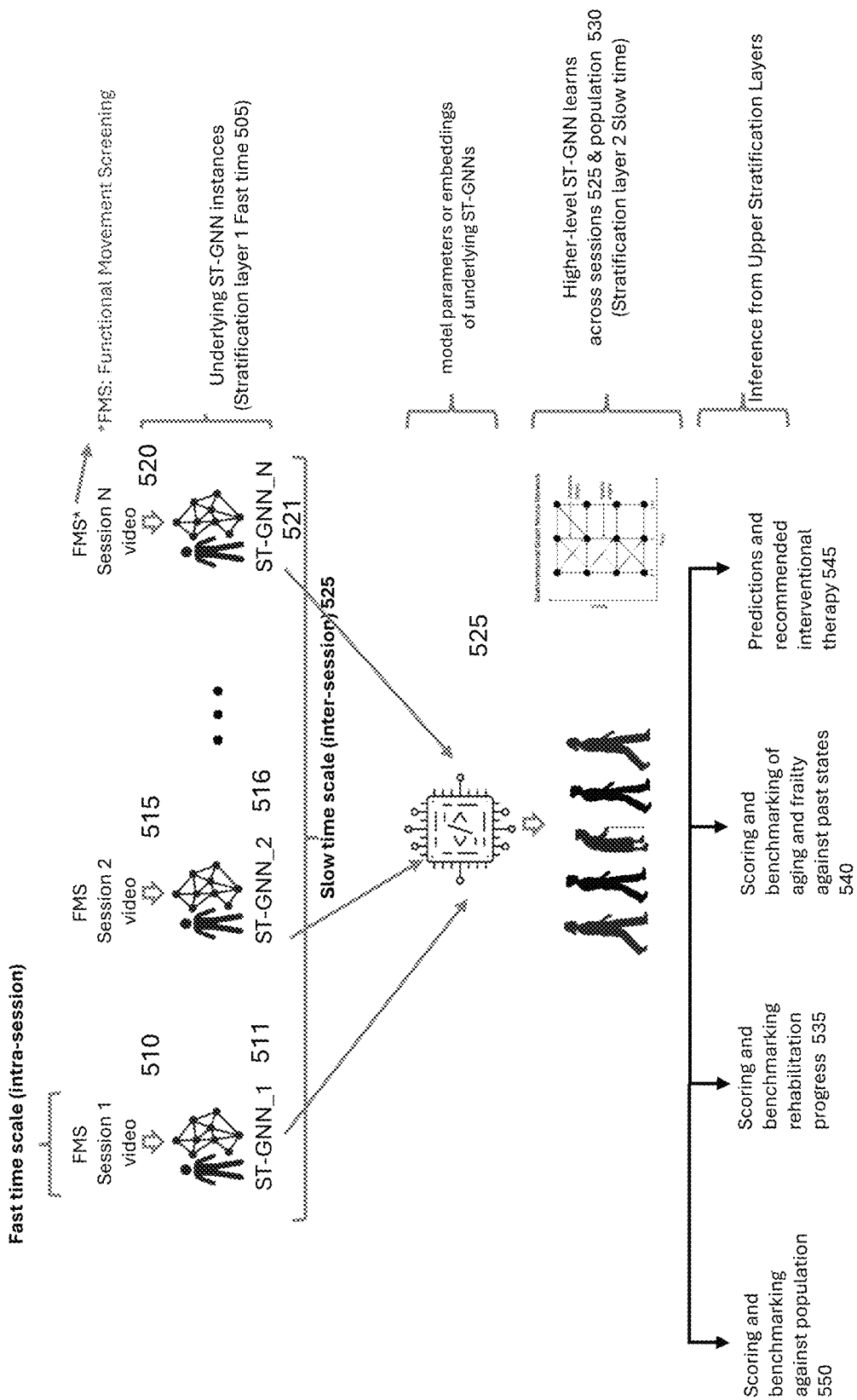
FIG. 5 illustrates a stratified architecture and data flow of a multi-layer ST-GNN emphasizing multiple and/or distinct temporal scales according to exemplary embodiments.

FIG. 5 illustrates a stratified architecture and data flow of a multi-layer ST-GNN emphasizing multiple and/or distinct temporal scales according to exemplary embodiments. In exemplary embodiments, a fast time scale represents short-term motion dynamics captured within a single examination session. In these implementations, multiple FMS session videos 510, 515 and 520 (capturing functional movement screening (FMS) activities such as walking, jumping, or squatting) representing FMS sessions 1, 2 and N (or single examination sessions 1, 2 and N) are analyzed and spatio-temporal graphical neural networks ST-GNN_1 511, ST-GNN_2 516 and ST-GNN_N 521 may be generated or created). In contrast, the Slow time scale ST-GNN 525 may span a significantly longer duration, covering weeks, months, or years, and may encompass multiple physical therapy or exercise sessions throughout a rehabilitation treatment or across a patient's lifespan. Video data from each individual session 510 515 or 520 are processed into lower-level spatio-temporal Graph Neural Networks (ST-GNNs 511, 516, and 521). These lower-level embeddings are subsequently fed into a higher-level ST-GNN 525, enabling the higher-level slow time ST-GNN 525 model to learn and track an evolution of the patient's gait and pose patterns over extended periods. In exemplary embodiments, this stratified model supports broader clinical applications for use of the captured data and analyzation by software algorithms or applications, including longitudinal assessments of patient recovery and rehabilitation process 535, aging and frailty benchmarking relative to personal past states 540 and population standards 550. In exemplary embodiments, analyzation by software algorithms of the captured data in the higher-level ST-GNNs 525 may include predictive analytics for future health disorders and recommendations for targeted therapeutic interventions 545.

Figure 6:
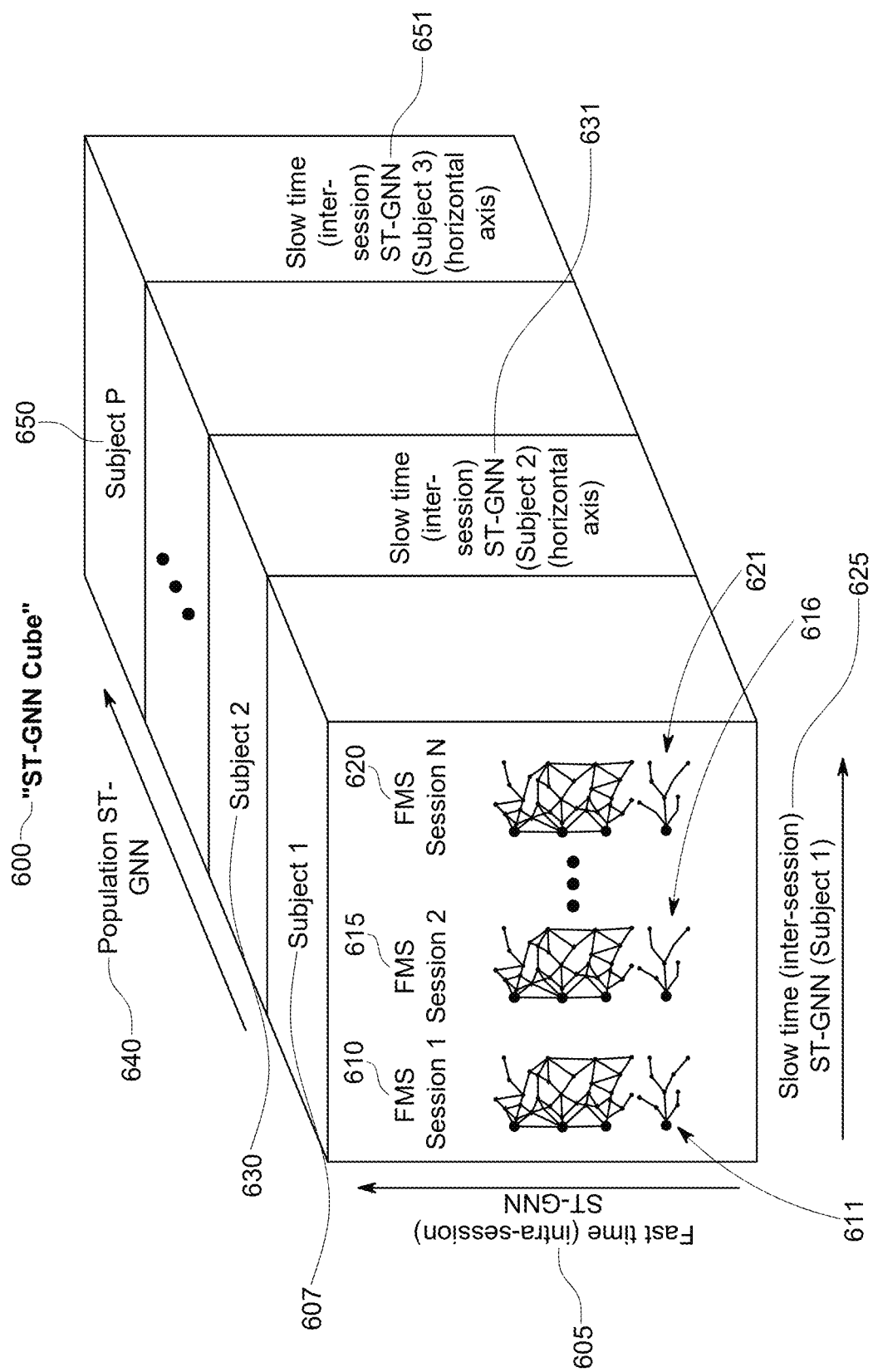
FIG. 6 illustrates our multi-layer stratified spatio-temporal graph neural network (ST-GNN) architecture (ST-GNN Cube) according to exemplary embodiments.

In exemplary embodiments, a stratified multi-layer spatio-temporal graph neural network (ST-GNN) includes three layers, four layers and/or five layers. In exemplary embodiments, the multi-layer stratified ST-GNN may be represented as and/or referred to as an ST-GNN Cube (representing multi-dimensional GNNs). FIG. 6 illustrates our multi-layer stratified spatio-temporal graph neural network (ST-GNN) architecture (which may be referred to as an ST-GNN Cube) according to exemplary embodiments. In exemplary embodiments, the ST-GNN Cube visualized in FIG. 6 as a 3-D space where lowest level cells (e.g., layer 1 cells) are fast-time (intra-session) ST-GNN models trained on a subject (patient) based on the videos of the subject during an exam. Illustratively, for a subject 1, a FMS Session 1 video 610 is analyzed to generate fast time ST-GNN 611, FMS Session 2 video 615 is analyzed to generate fast time (intra-session) ST-GNN 612, and FMS Session N video 620 is analyzed to generate fast time (intra-session) ST-GNN 621 which are all layer 1 or a first layer ST-GNNs. In exemplary embodiments, these fast time (intra-session) ST-GNNs for different moments in time feed into a higher level or level 2 ST-GNN (which may be referred to as a slow time (inter-session) ST-GNN 625) for subject 1 607. Similarly, a number of subjects (e.g., subject 1 607, subject 2 630 and/or up to subject P 650) may also have FMS session video analyzed to generate fast time (intra-session) ST-GNNs for a number of exercise or therapy sessions for the other subjects and each of the subjects' fast time (intra-session) ST-GNNs may be utilized to generate or form slow time (inter-session) ST-GNNs for each of the subjects (as illustrated by slow time (inter-session) ST-GNN 625 for subject 1 607, slow time (inter-session) ST-GNN 631 for subject 2 630 and up to slow time (inter-session) ST-GNN 651 for subject P 650. This allows the ST-GNN cube to capture gait and pose characteristics at multiple scales. As illustrated in FIG. 6, a vertical dimension is a Fast time scale encoding of short-term dynamics from individual examination, training, or therapy sessions, which may be referred to as Layer 1 505. Each session's characteristic at that point in time is embedded into distinct ST-GNN representations indexed as the $i^{th}$ instance of ST-GNN (which are illustrated by ST-GNN 611, ST-GNN 616 and ST-GNN 621). As further illustrated in FIG. 6, a horizontal direction is the Slow time (inter-session) ST-GNN 525 that integrates information, data, and/or parameters across multiple sessions, capturing longitudinal gait and pose changes throughout multi-session rehabilitation programs, multi-day, week, month or year athletic training, or the multiple subjects' or patients' lifespan, which may be referred to as Layer 2 or a second dimension. As illustrated in FIG. 6, a third-layer or population ST-GNN 640 may integrate information, data and/or parameters across multiple subjects or patients. This may be referred to as a diagonal population 640. In other words, this diagonal dimension or Layer 3 ST-GNN or GCN 640 represents different subjects belonging to a population, and/or captures longitudinal gait and pose measurements and/or changes for a population or number of subjects. In exemplary embodiments, a fourth or additional layer in the multi-layer stratified spatio-temporal graph neural network (ST-GNN) in the ST-GNN model cube further stratifies the data, information, parameters or measurements, into meaningful subgroups based on criteria such as age, ethnicity, height, weight, or geography. This comprehensive stratification in the multi-layer stratified spatio-temporal graph neural network (ST-GNN) enables or allows personalized benchmarking, predictive modeling, and targeted therapeutic interventions informed by group-level patterns and norms.

In exemplary embodiments, a good implementation of a spatio-temporal graph neural network is a spatio-temporal graph convolutional network (ST-GCN). In exemplary embodiments, a spatio-temporal graph convolutional network (ST-GCN) may include a stratified structure with three distinct layers. In exemplary embodiments, a first layer (Fast time) ST-GCN may be configured to embed and represent short-term gait and pose characteristics captured during examination, training, or therapy sessions of the subject into distinct spatio-temporal graph convolutional networks. In exemplary embodiments, a second layer (Slow time) ST-GCN may be configured to integrate and analyze spatio-temporal embeddings (or slow time/second layer) ST-GCNs from multiple examination, training or therapy sessions of the subject, thereby capturing longitudinal gait and pose changes during multiple rehabilitation sessions, multiple athletic training sessions, or across the subject's lifespan. In exemplary embodiments, a third layer (or Population level) ST-GCNs 650 configured to aggregate and analyze longitudinal gait and pose changes across a population of subjects, wherein the population of subjects may also be stratified into subgroups based on criteria selected from age, ethnicity, height, weight, or geographic region. In exemplary embodiments, the multi-layer stratified spatio-temporal graph convolutional network (multi-layer stratified GCN) results in personalized benchmarking, population-level comparative analyses, predictive modeling, and/or recommendations for targeted therapeutic interventions.

Figure 7:
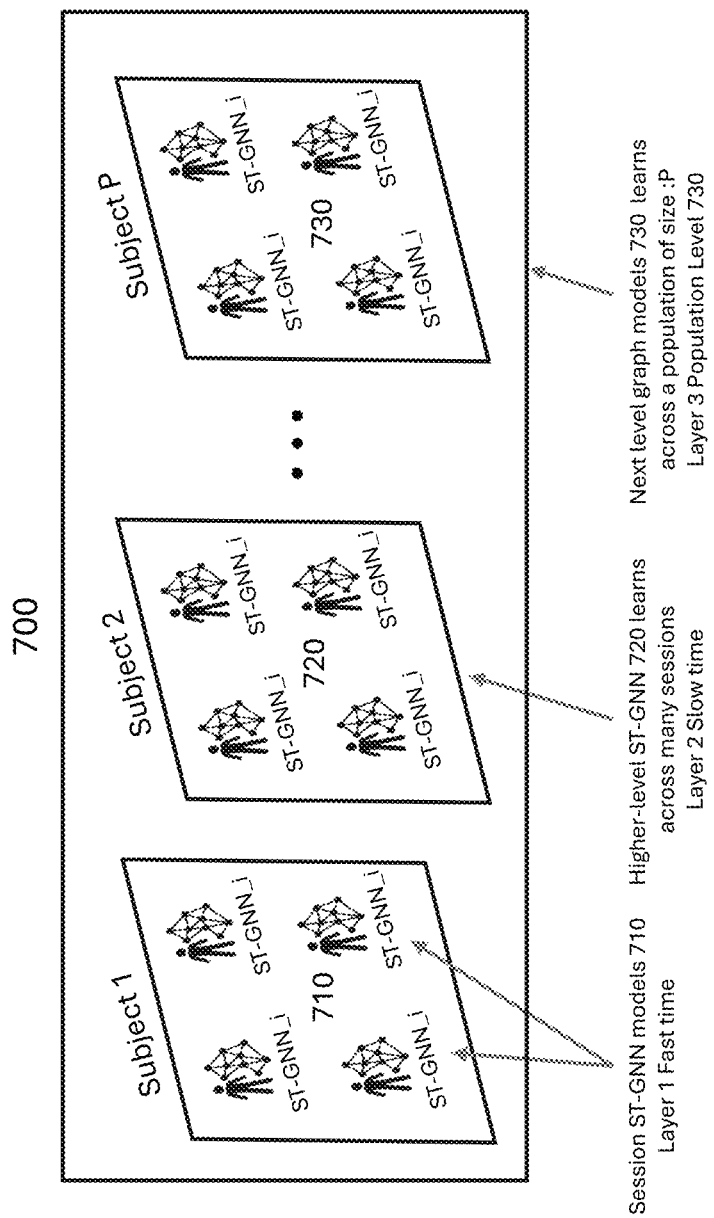
FIG. 7 illustrates a three-layer stratified spatio-temporal graph neural network (ST-GNN) architecture designed to capture gait and pose characteristics at and/or across multiple scales according to exemplary embodiments.

FIG. 7 illustrates a three-layer stratified spatio-temporal graph neural network (ST-GNN) architecture designed to capture gait and pose characteristics at and/or across multiple scales according to exemplary embodiments. In exemplary embodiments, Layer 1 (Fast Time or intra-session) ST-GNNs of the three-layer stratified ST-GNN 700 encodes short-term dynamics from individual examination, training, or therapy sessions for a patient or subject. Each session's characteristic at that point in time is embedded into distinct ST-GNN representations indexed as the $i^{th}$ instance of ST-GNN as illustrated in reference number 710 of FIG. 7. In exemplary embodiments, Layer 2 (Slow Time or inter-session) ST-GNNs 720 of the three-layer stratified ST-GNN integrates information across multiple sessions for a subject or patient, capturing longitudinal gait and pose changes for subjects or patients throughout multi-session rehabilitation programs, multi-session athletic training, or a subject's lifespan. In exemplary embodiments, Layer 3 (Population Level) ST-GNNs 730 of the three-layer stratified ST-GNN aggregates and analyzes gait patterns across a broader population of subjects or patients of size P. In exemplary embodiments, the three-layer stratified ST-GNN may be further stratified into a fourth dimension or fourth layer which may include meaningful subgroups for the data or information based on criteria such as age, ethnicity, height, weight, and/or geography. This comprehensive stratification enables personalized benchmarking, predictive modeling, and targeted therapeutic interventions informed by group-level patterns and norms of the parameters, measurements, data and/or information aggregated from the analyzed video frames and image sequences of exercise and/or therapy sessions of the patient or subject.

Figure 8:
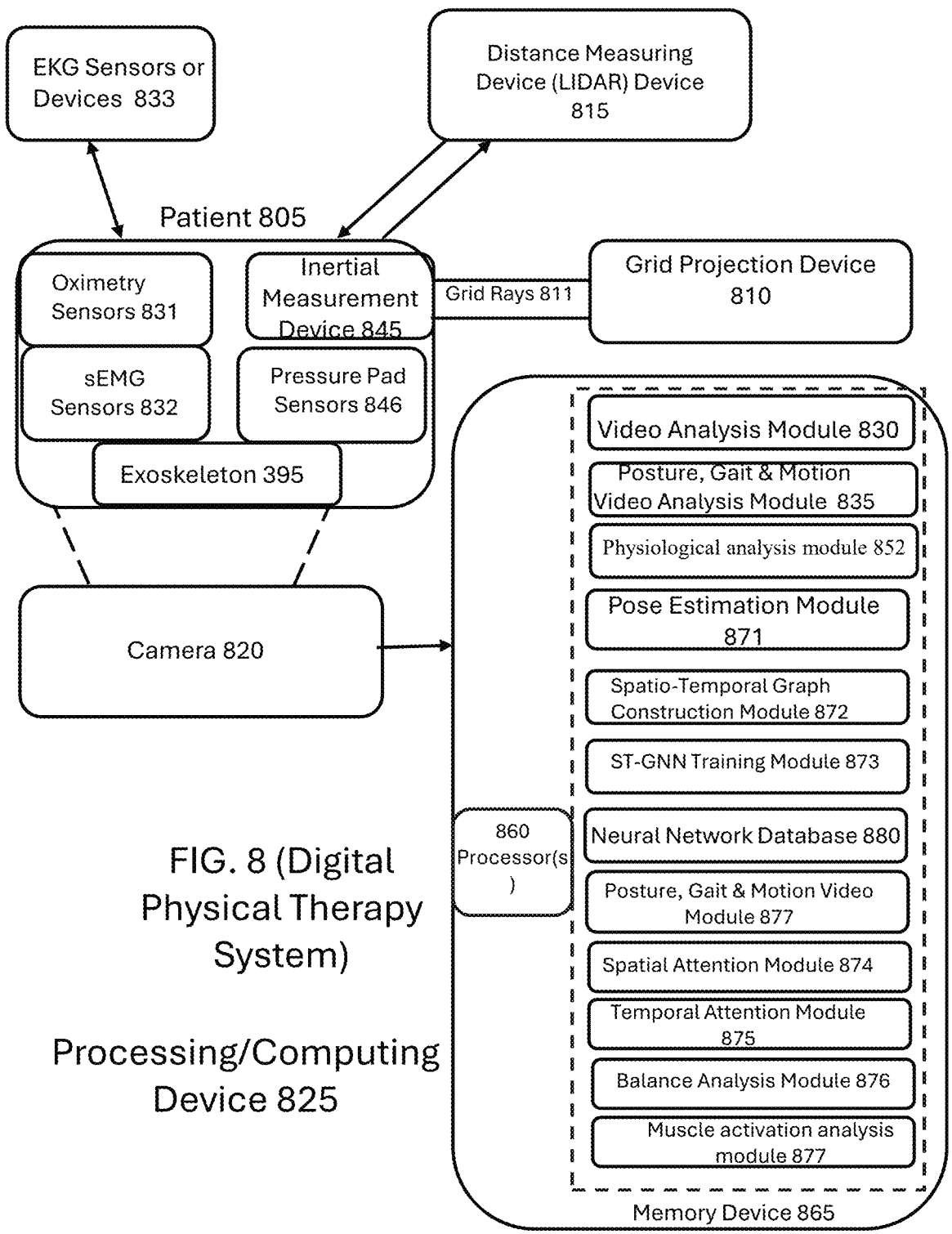
FIG. 8 illustrates a block diagram of a system for capturing image and video frame sequences according to exemplary embodiments.

FIG. 8 illustrates a block diagram of a system for capturing image and video frame sequences according to exemplary embodiments. In exemplary embodiments, the digital physical therapy system 800 may include one or more cameras or imaging devices 820, a distance measurement device 815, a grid projection device 810, a number of wearable or attachable devices or sensors 831, 832, 845 or 846, and/or a therapy or medical computing device 825, where the therapy or medical computing device 825 may include one or more processors or controllers 860 and one or more memory devices 865 where computer-readable instructions may be stored in one or more memory devices 865. The computer-readable instructions may be software such as modules or method steps discussed with respect to FIGS. 2A-2C, 3A-3C, and FIG. 8 below. In exemplary embodiments, the wearable of attachable devices may include one or more oximetry sensors 831, one or more inertial measurement units, devices or sensors 845, one or more sensors with surface electromyography (EMG sensor(s)) 832 and/or one or more pressure pad sensor(s) 846. In exemplary embodiments, the wearable of attachable devices may include electrocardiogram (EKG) sensors 833. In addition, an exoskeleton device 395 may be coupled, connected or attached to the patient 395.

In exemplary embodiments, the computer-readable instructions stored in the one or more memory device(s) 865 of the therapy or medical computing device(s) 825 and/or executable by the one or more processors 860 of the one or more medical or therapy computing device(s) may include a video analysis module 830, a physiological analysis module 852, a posture, gait and motion analysis module 835, a muscular activation analysis module 877, a balance analysis module 876, a pose estimation module 872, a spatio-temporal graph construction module 872, a ST-GNN training module 873, a neural network database 880, a posture gait and motion video module 877, and or a temporal attention module 875, and/or a spatial attention module 874. In exemplary embodiments, the therapy or medical computing device 825 may further include a neural network database 880, which may be part of one or more memory devices 860 in the therapy or medical computing device 825.

In exemplary embodiments, the one or more cameras or imaging devices 820 may capture high-resolution video data (or video files) of a patient's 805 body and/or specific joints of a patient's body (e.g., knee, elbow, ankle, shoulder), while the patient body part makes various movements during exercise sessions (e.g., physical therapy sessions or regular exercise sessions). In exemplary embodiments, the one or more cameras or imaging devices 820 may be positioned to provide a clear view of a patient's body and/or joints. In exemplary embodiments, the one or more cameras or imaging devices 820 may transfer or communicate the video data, video files, or sequences of video frames or images to the one or more medical or therapy computing device(s) 825.

In exemplary embodiments, the video analysis module 830 may analyze the transferred sequences of video frames in the video data or video files to track a position of patient's body during physical therapy or medical exercises over an exercise session. In other words, a sequence of images or video frames may be analyzed by the video analysis module 830. In exemplary embodiments, the sequence of images or video frames may be stored in one or more databases including the neural network database 880.

In exemplary embodiments, a distance measuring device 815 may be utilized in a vicinity of the patient in order to determine distances between different body parts of the patient and the distance measuring device in order to determine postural characteristics of the patient. In exemplary embodiments, the distance measuring device 815 may be a light detection and ranging device (LIDAR). In exemplary embodiments, the distance measuring device 815 may project beams onto the patient 805 and may receive reflected beams back off of the patient. In these embodiments, end of flight sensors may receive the reflected beams back from the patient and may communicate the measurements to be processed in order to determine distances to the patient. In exemplary embodiments, the structured illumination device 810 may project a structured pattern onto the patient in order to provide reference areas or reference points which the system and method may utilize to assist in determining how far different parts of the body are from the distance measuring device. In exemplary embodiments, the patient curvature data or measurements may be saved in each visit allowing longitudinal assessment of patient progression over time. In the example described above, 3D patient hand curvature measurements may be generated and/or stored.

In exemplary embodiments, one or more inertial measurement device or unit(s) 845 may be worn by the patient. In exemplary embodiments, the one or more inertial measurement units (IMUs) 845 may generate three-dimensional movement data or parameters of the user. In exemplary embodiments, the one or more IMUs 845 may communicate the 3D movement unit data or parameters to the therapy or medical computing device(s) 825. In exemplary embodiments, the 3D movement data or parameters may be stored in the neural network database 880 and/or utilized by the graph neural network.

In exemplary embodiments, the one or more wearable sensors may include surface electromyography (sEMG) technology (e.g., EMG sensors) 832. In exemplary embodiments, the EMG sensors 832 may be incorporated into the system to generate or calculate measure muscle activation patterns or measurements or parameters in relation to posture. In exemplary embodiments, EMG sensors 432 may provide insight into the muscular contributions to postural problems, which may be important for creating effective treatment plans. In exemplary embodiment, the EMG sensors 832 generate electrical signals representative of musical activation patterns. In exemplary embodiments, a muscle activation analysis module 877 may receive the electrical signals representative of muscle activation patterns and convert these to muscle activation parameters. Although the muscle activation analysis module 877 is illustrated as being part of the one or more therapy computing devices, it can also be part of the EMG sensors 832. Thus, in exemplary embodiments, the EMG sensors 832 may provide biofeedback to optimize therapeutic interventions. In exemplary embodiments, the muscle activation parameters or measurements may be stored in a database in the therapy computing device 825 and this may be the neural network database 880. In the example described above, one or more EMG sensors 832 may be placed on a patient's joint, and the joint's activation patterns or measurements may be communicated to the therapy or medical computing device 820 for use in additional analysis of the analyzed images or video frame sequences.

In exemplary embodiments, the one or more wearable sensors may include one or more pressure pad sensors 846. In exemplary embodiments, the one or more pressure pad sensors 846 may be stood on by the patient or connected to the patient during prescribed exercise or physical therapy sessions. In exemplary embodiments, the one or more pressure pad sensors 846 may generate patient weight distribution parameters for the patient or subject. In exemplary embodiments, the generated patient weight distribution parameters may be communicated from the one or more pressure pad sensors 846 to the therapy or medical computing device 825 for analysis. In exemplary embodiments, the patient weight distribution parameters may be stored in a database in the therapy computing device(s) 825 and this may be the neural network database 880. In exemplary embodiments, the weight distribution parameters could indicate that the patient was off balance during exercise or therapy sessions and this may be used in additional analysis of the analyzed images or video frame sequences and the constructed graphs and the spatio-temporal graph neural networks described herein.

In exemplary embodiments, the one or more wearable sensors may include one or more oximetry sensors or pulse oximetry sensors 831. In exemplary embodiments, the one or more oximetry sensors 831 may be attached or connected to a patient's body 805. In exemplary embodiments, the digital physical therapy system or method may utilize wearable pulse and oximeter sensors 831 for real-time monitoring and collection of heart rate and blood oxygen and $CO_2$ levels during the physical therapy or exercise sessions. In exemplary embodiments, the pulse and oximeter sensors 831 may generate heart rate measurements, blood oxygen levels or parameters and/or $CO_2$ levels, measurements or parameters and communicate the heart rate measurements, blood oxygen levels or parameters and/or $CO_2$ levels to the therapy or medical computing device 825 for analysis and storage. In exemplary embodiments, a physiological analysis module 852 may analyze the heart rate measurements, blood oxygen levels or parameters and/or $CO_2$ levels and generate a patient physiological assessment measurement. In exemplary embodiments, the patient physiological assessment measurement, the heart rate measurements, blood oxygen levels or parameters and/or $CO_2$ levels may be stored in a database in the one or more medical or therapy computing devices 825 and this may be the neural network database 880. In exemplary embodiments, the patient physiological assessment measurement, the heart rate measurements, blood oxygen levels or parameters and/or $CO_2$ levels may be utilized by the medical or therapy computing device 820 for use in additional analysis of the analyzed images or video frame sequences and the constructed graphs and the spatio-temporal graph neural networks described herein.

Data and information of the GNNs described above are stored in one or more databases, which are located in one or more memory devices of one or more computing devices. This may include the neural network database 880. In other words, all of the files and/or data described in FIGS. 2-7 above, may be stored in one or more memory devices, including but not limited to the neural network database 880. In addition, while the neural network database 880 is shown as one module in the one or more memory devices 865 of the one or more physical therapy devices 825, the neural network database may span multiple memory devices located on multiple computing devices. Accordingly, although FIGS. 2-8 illustrates one therapy computing device, due to the large storage requirements and/or large processing requirements of graph neural networks, machine learning devices and artificial intelligence devices, the therapy computing device 825 may include hundreds, thousands, tens of thousands, or even hundreds of thousands of computing devices and/or memory devices. In addition, there may be a plurality of databases corresponding to different aspects of the graph neural networks (e.g., different layers, different dimensions, exercise sessions, and/or other demographics within the databases). Additionally, data and/or information in GNNs may be represented as a graph, consisting of nodes (vertices) and edges (connections between nodes). Common formats for storing graph data include a) an adjacency matrix which is a square matrix where each element indicates whether pairs of nodes are connected. This format is useful for dense graphs but can be memory-intensive for large, sparse graphs; b) an Edge List which is a list of all edges in the graph, where each edge connects two nodes and this format is more memory-efficient for sparse graphs and is often easier to manipulate; and/or c) a Node Features Matrix: which is a matrix where each row corresponds to a node and each column represents a feature and this matrix can be used alongside the adjacency representation to provide additional context for each node. In exemplary embodiments, for smaller graphs, data can be loaded into memory devices for quick access and manipulation. In some implementations, libraries like NetworkX (for Python) may provide efficient in-memory graph representations of graph neural networks. In some implementations, for larger graph neural networks, specialized databases like Neo4j or Amazon Neptune can be used to store and query graph data efficiently.

With respect to the system described in FIGS. 2B, 3B and 8, the analysis devices described herein (e.g., the one or more imaging devices or cameras 820; the sensors 831, 832, 833, 845, 846; the grid projection device 810, and/or the distance measuring device 815) may directly or indirectly communicate the above-identified parameters, data and/or measurements to the one or more therapy or medical computing device(s) 825. In other words, these analysis devices may themselves be capable of transmission (via wireless or wired communication protocols) to the one or more therapy or medical computing device(s) 825 or they may be communicatively coupled to other portable computing devices (e.g., laptops, tablet computing devices, network computing devices and/or wearable computing devices) that in turn then can communicate or transmit the above-identified parameters, data and/or measurements to the one or more therapy or medical computing device(s) 825.

The wearable sensors described herein (e.g., EMG sensors, IMU sensors, EKG devices or sensors, oximetry sensors and/or balance or pressure pads) may also operate in a similar fashion where electrical signals from these sensors are converted to digital data signals and/or files that are then used and/or analyzed by the various module of the therapy or medical computing device(s) 825. As noted above, their may be intermediary computing devices between the sensor(s) and the one or more therapy or medical computing device(s) 825 such as laptop, desktop, handheld, portable or wearable computing devices or controllers that receive the electrical signals (in some cases analog) and convert these signals into digital data files for processing by the software modules of the one or more therapy and medical computing device(s) 825.

While one computing device is shown in FIG. 8, the one or more therapy or medical computing device(s) 825 may actually consist of multiple computing devices and/or server computing devices. The one or more therapy or medical computing device(s) 825 may be local computing devices communicatively coupled via local area networks or personal area networks. In exemplary embodiments, the one or more therapy or medical computing device(s) 825 or may be cloud-based computing devices that are communicatively coupled with global communication networks (as well as other communication networks). The use of a single computing device in FIGS. 2B, 3B and 8 does not limit the scope of the subject matter described herein. This is also true of the computing devices described and illustrated in the systems and methods of FIGS. 2A-2C, 3A-3C and 8. The operation of the pose estimation module 871, spatio-temporal graph construction module 872, ST-GNN training module 873, the posture, gait and motion video module 877, the spatial attention module 874, and the temporal attention module 875 is similar to the description of FIG. 2B for the same or similarly name modules (e.g., pose estimation module 271, spatio-temporal graph construction module 272, ST-GNN training module 273, the posture, gait and motion video module 277, the spatial attention module 274, and the temporal attention module 875) and will not be repeated here.

Mobile—Mobile Examination and Rehabilitation Center. Access to rehabilitation services remains a major challenge in rural, underserved, and post-operative settings. Conventional therapy often requires repeated travel to clinics or hospitals, placing a burden on patients and caregivers. Moreover, generalized rehabilitation protocols often fail to adapt to the specific recovery trajectories of individual patients. The is exacerbated by a severe shortage of qualified physical therapists in many geographic locations.

Gait recognition models powered by ST-GNNs offer a powerful approach to understand joint behavior over time by modeling the body as a graph of interconnected joints, as is described above with respect to FIGS. 1-8.

Figure 9:
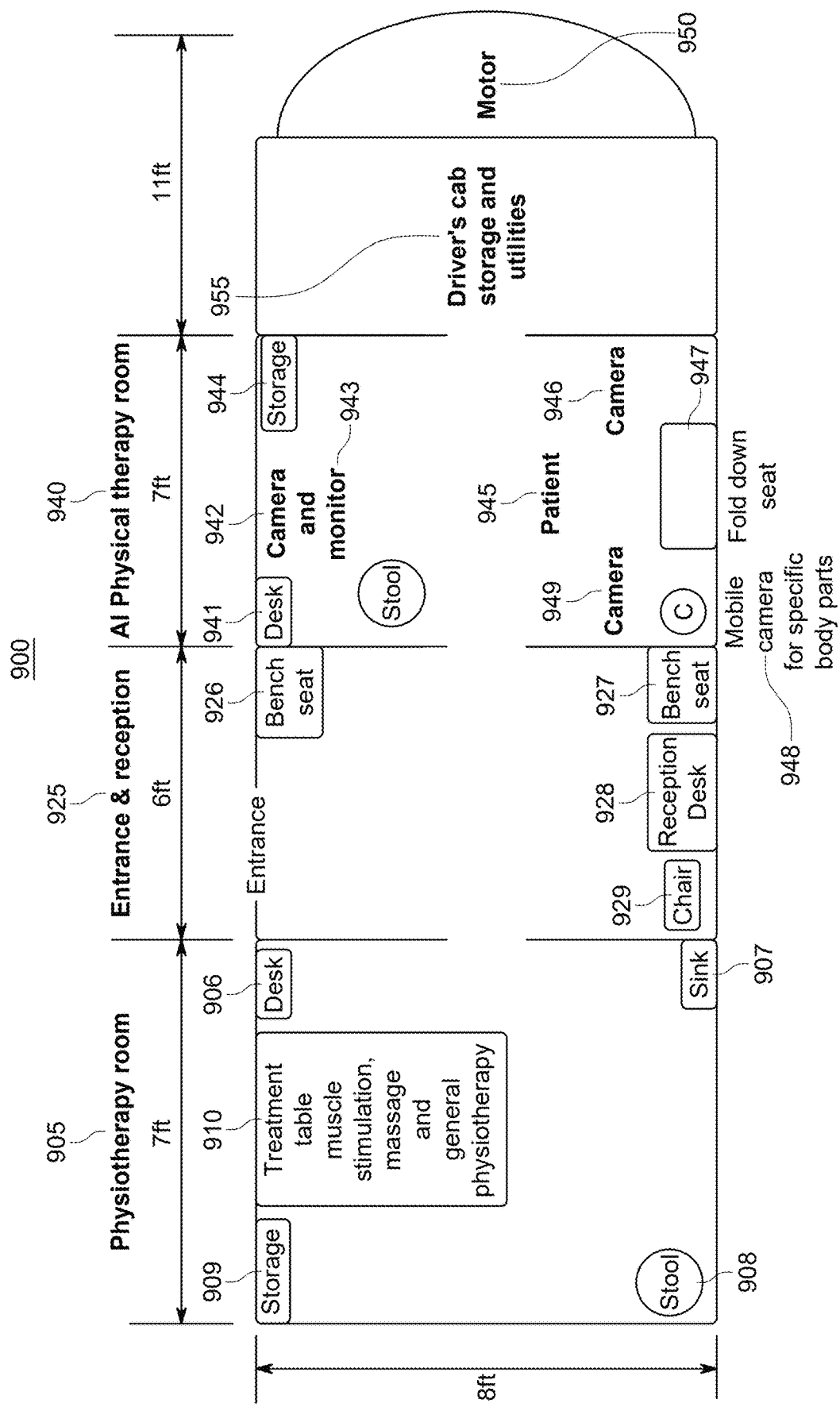
FIG. 9 illustrates a mobile rehabilitation system according to exemplary embodiments.

FIG. 9 illustrates a mobile rehabilitation system according to exemplary embodiments. In exemplary embodiments, a mobile rehabilitation system may be equipped with one or more cameras and other sensors, one or more computing devices including one or memory devices and computer-readable instructions, where the computer-readable or executable instructions include software executed by one or more processors or controllers that execute the methods and/or systems described in FIGS. 1-8 above, including but not limited to generating, training and/or updating spatio-temporal graph neural networks. In exemplary embodiments, the ST-GNNs in addition to or in place of, a medical professional, may operate assist in providing expert-level and objective therapy in remote locations, monitor progress longitudinally or over time, and adapt interventions into therapy or exercise routines in real time. In exemplary embodiments, the systems and methods described herein installed in a mobile rehabilitation system may serve patients recovering from orthopedic surgeries, managing sports injuries, and/or experiencing age-related frailty who do not have the ability to visit a medical facility. In exemplary embodiments, the mobile rehabilitation system 900 may have one or more motor assemblies or sections 950 configured to drive a vehicle housing the system, a driver's cab 955 including storage and other utilities along with all of the driving interface for a human or driver to interface with the one or more motor assemblies 955, a physiotherapy room or area 905, an entrance or reception area 925 and/or an AI physical therapy room or section 940. In exemplary embodiments, the entrance or reception area 925 may include one or more bench seats 926 and 927 (or one or more chairs 929) for patients to sit on while waiting for an appointment and one or more reception desks 928 where subjects or patients can check in for the AI-monitored therapy 940 and/or the physiotherapy room 905. In exemplary embodiments, the physiotherapy room 905 may include a desk 906 for the therapist or medical professional to utilize, one or more sinks 907 where medical professionals can wash off between sessions or patients can wash off or clean up, one or more stools 908 where either the therapist or medical professional can sit and/or one or more storage area or closets 909 where supplies and/or towels may be stored. In addition, the physiotherapy room 905 may also include one or more treatment tables 910 that the patient or subject may lie on or sit on, where the patient or subject may receive muscle stimulation treatments, massage treatments or general physiotherapy treatments from therapists or other medical professionals.

In exemplary embodiments, the AI physical therapy room 940 may include one or more desks or stools 941 that the physical therapist or medical professional can use to monitor the patient during exercise routines. In exemplary embodiments, the AI physical therapy room 940 may include a storage area 944 where the physical therapist or medical professional may store supplies. In addition, one or more cameras or imaging devices 942, 946 and/or 949 may capture different views of a patient 945 performing the physical therapy or athletic exercises. In these embodiments, the cameras or imaging devices 942, 946 and/or 949 may capture a front on view and/or two side views of the patient or subject performing the physical therapy or athletic exercises. In exemplary embodiments, there may be one or more display devices 943 where real-time feedback can be provided to the patient and/or subject and/or where images and/or processed images may also be shown to the patient or subject. Further, the AI physical therapy room 940 may also include one or more mobile cameras or imaging devices 948 that may be utilized to capture images of specific body parts of the patient or subject, which may also be processed by one or more computing devices, one or processors and/or computer-readable software executable by the one or more processors. In exemplary embodiments, the computer-readable software executable by the one or more processors of the one or more computing devices in the mobile rehabilitation system may perform or execute the methods or systems described above in FIGS. 1-8. In other words, spatio-temporal graphical neural nodes may be generated for each exercise or therapy session occurring in the mobile rehabilitation system. Further, as described above, a multi-layer stratified spatio-temporal graph neural network (ST-GNN) architecture (ST-GNN Cube) may be generated over multiple therapy or exercise sessions over a number of patients or subjects that utilize the mobile rehabilitation system over a number of sessions. In exemplary embodiments, the mobile rehabilitation system 900 may also include one or more computing devices (not shown), one or more memory devices (not shown), and one or more processors or controllers (not shown), where computer-readable instructions executable by the one or more processors or controllers. In some cases, the mobile rehabilitation system 900 may have one or more computing devices but may communicate with one or more cloud computing devices so that more ST-GNNs processing is performed in the cloud rather than the computing devices in the mobile rehabilitation system. In exemplary embodiments, the mobile rehabilitation system 900 may also include one or more wireless communication transceivers that communicate with computing devices via personal area network or local area network wireless communication protocols and/or one or more network interface devices that communicate with local area network, wide area network or global communication networks via wired and/or wireless communication protocols. In exemplary embodiments, the motor 950 and/or drivers cab section 955 may be 11 feet in length and/or 8 feet in width or in alternative embodiments, may range from 6 to 16 feet in length and/or 4 feet to 13 feet in width. In exemplary embodiments, the physiotherapy room 905 may be 7 feet in length and/or 8 feet in width, or in alternative embodiments, may range from 3 feet to 12 feet in length and/or 4 feet to 13 feet in width. In exemplary embodiments, the entrance and/or reception are 925 may be 6 feet in length and/or 8 feet in width, or in alternative embodiments, may range from 3 feet to 12 feet in length and/or 4 feet to 13 feet in width. In exemplary embodiments, the AI physical therapy room may be 7 feet in length and/or 8 feet in width, or in alterative embodiments, may range from 5 feet to 15 feet in length and/or 4 to 13 feet in width.

In exemplary embodiments, the methods and systems described in FIGS. 1 to 9 may incorporate interactive video games as part of examination and rehabilitation protocols performed by subjects or patients. This may enhance patient engagement and motivation during the therapy or exercise sessions. In exemplary embodiments, these interactive video games may be implemented by computer-readable instructions that are stored in one or more memory devices and/or executable by one or more processors that are part of computing devices either in normal medical offices and/or mobile rehabilitation systems (like those described in FIG. 9). In exemplary embodiments, these interactive video games are designed to align with specific therapeutic goals such as balance, coordination, joint mobility, and/or gait normalization and may include motions and/or actions that test a patient's or subject's balance, coordination, joint mobility and/or gait normalization. In these embodiments, where these interactive video games request users or subjects to perform these actions, the one or more cameras or imaging devices may capture sequences of images or video frames where the systems and methods continuously analyzes the patient's movements in real time (utilizing the ST-GNNs), determines movements or actions that would improve the patient's performance or movements, maps or presents the movements to game controls and/or interfaces, and enabling and/or allowing the patient to interact with on-screen challenges by performing prescribed therapeutic motions. In exemplary embodiments, an exoskeleton may provide adaptive support or resistance during the interactive video gameplay, where the actions of the exoskeleton may be calibrated dynamically by the systems and methods described herein in FIGS. 1-9 (including the ST-GNNs) based on the patient's performance and predicted stability. In these embodiments, game difficulty levels may be adjusted automatically in response to the patient's progress and fatigue, ensuring both safety and sustained challenge. This integration of gamified interaction promotes adherence to therapy while collecting rich spatio-temporal data for model refinement and clinical assessment.

In exemplary embodiments, a method for pose and gait classification and motion prediction using spatio-temporal relationships between body joints includes capturing a sequence of images or video frames of a subject; applying a neural network-based pose estimation algorithm to the sequence of images or video frames to detect landmark positions of one or more anatomical joints; constructing a spatio-temporal graph from the detected landmark positions of the one or more anatomical joints, wherein nodes of the spatio-temporal graph correspond to one or more anatomical joints and the landmark positions, spatial edges of the spatio-temporal graph represent anatomical connections between the one or more anatomical joints within a single image or frame, and temporal edges connect the one or more anatomical joints across successive images or frames of the sequence of images or video frames; and inputting the constructed spatio-temporal graph into a spatio-temporal graph convolutional network (ST-GCN) to classify pose and gait patterns and predict motion or stability states for the constructed spatio-temporal graph; and enhancing the ST-GCN with a spatio-temporal attention module to emphasize the one or more relevant joints and a temporal attention module to emphasize critical timeframes. In exemplary embodiments, a composite stratified ST-GCN model includes a higher-level spatio-temporal graph convolutional neural network (ST-GNN) model is trained on multiple additional ST-GCNs from multiple additional longitudinal examination sessions and the ST-GCN where the multiple additional longitudinal examination sessions are spaced apart by days, weeks, months, or years from an initial examination session, wherein the composite stratified ST-GCN model includes a fast time scale ST-GCN configured to capture intra-session temporal patterns by learning from the sequence of images or video frames within the initial examination session, and a slow time scale ST-GCN configured to capture inter-session temporal patterns by learning from the pose or gait pattern measurements across the multiple additional longitudinal examination sessions, such that the composite trained stratified ST-GCN model encodes both short-term or intra-session motion and long-term functional or aging-related changes in the pose or gait patterns, including comparisons before and after surgery performed on the subject, across therapy milestones for the subject, or throughout the lifespan of the subject.

In exemplary embodiments, the method further includes incorporating sensor data from one or more wearable devices captured from inertial measurement units (IMUs) and surface electromyography (EMG) sensors, wherein the sensor data is fused with the constructed spatio-temporal graph input to the ST-GCN. In exemplary embodiments, the spatio-temporal graph further comprises one or more attributed nodes and one or more attributed edges, wherein each attributed node of the one or more attributed nodes includes one or more time-dependent attributes selected from joint coordinates, internal measurement units (IMU) data (joint velocity, joint acceleration, or joint angles) or surface electromyography (EMG) signals; and each attributed edge includes one or more attributes selected from inter-joint distances, bone orientation vectors, relative angles, joint displacement across the sequence of images or video frames, or biomechanical symmetry metrics; and wherein node and edge time-dependent attributes vary over time to represent a non-static and non-stationary nature of human gait, allowing the ST-GCN to learn both short-term kinematic changes and long-term biomechanical trends. In exemplary embodiments, the method further includes training the ST-GCN on training video sequences labeled with corresponding gait types selected from Functional Movement Screening (FMS) tests including deep squat, hurdle step, in-line lunge, shoulder mobility, active straight leg raise, trunk stability push-up, or rotary stability.

In exemplary embodiments, the method further includes training the ST-GCN on training video sequences and sensor data from an athlete or an exemplary healthy individual, in the appropriate age group, against which the subject can be scored based on the subject's exercise and therapy session, and utilization of the ST-GCN trained on the video sequences and sensor data from the athlete or the exemplary health individual, to identify movement deficits of the subject, such as limited range of motion, poor stability, or asymmetries, that could hinder performance or increase injury risk for the subject, and for rehabilitation planning for the subject. In exemplary embodiments, the ST-GCN is configured to predict future motion states, to identify abnormal gait patterns, or to perform Fall Risk Assessment (FRA). In exemplary embodiments, the method further includes providing real-time feedback to the subject via communication from a therapy computing device to a computing device, when the subject is undergoing physical therapy or athletic training, based on the classified pose and gait patterns or the predicted motion or stability states generated by the ST-GCN. In exemplary embodiments, an output of the ST-GCN is used for biometric identification of subjects based on the classified pose and gait patterns for the subject. In exemplary embodiments, the method further includes storing the classified pose and gait patterns of the subject in one or more memory device devices of a therapy computing device which is a subject's personal gait model; and comparing a subject's prior personal gait model, prior to a medical intervention, to the subject's personal gait model, which is a post-intervention model, to evaluate recovery progress or therapy effectiveness, and to assist in rehabilitation planning for the subject. In exemplary embodiments, the method further includes storing the classified pose and gait patterns of the subject (which is the subject's personal gait model) for a specified point in the subject's life; which may be referred to as a gait digital twin frozen in time; and comparing the gait digital twin for the specified point in the subject's life with additional gait digital twins for associated additional points in the subject's life generated utilizing the steps discussed above, to assess and score the rate of aging and frailty for the subject. In exemplary embodiments, the sensor data is also input as part of the constructed spatio-temporal graph that is input into the ST-GCN to classify the pose and gait patterns and the predicted motion or stability states for the constructed spatio-temporal graph, the pose and gait patterns and the predicted motion or stability states are communicated to an exoskeleton device and the exoskeleton device dynamically adjusts device parameters based on the received pose and gait pattens and the predicted motion or stability states, wherein the adjustments to the exoskeleton device parameters include modulating joint torque, stiffness or support profiles to assist a user during movement, thereby allowing adaptive, personalized assistance for rehabilitation, fall prevision or movement enhancements.

In exemplary embodiments, the spatio-temporal graph convolutional network (ST-GCN) includes a stratified structure with three distinct layers including a) a first layer (Fast time or intra-session) configured to embed and represent short-term gait and pose characteristics captured during examination, training, or therapy sessions of the subject into distinct spatiotemporal graph neural networks; b) a second layer (Slow time or inter-session) configured to integrate and analyze spatio-temporal embeddings from multiple examination, training or therapy sessions of the subject, thereby capturing longitudinal gait and pose changes during rehabilitation, athletic training, or across the subject's lifespan; and c) a third layer (Population level) configured to aggregate and analyze longitudinal gait and pose changes across a population of subjects, wherein the population of subjects is stratified into subgroups based on criteria selected from age, ethnicity, height, weight, or geographic region, which results in personalized benchmarking, population-level comparative analyses, predictive modeling, and/or recommendations for targeted therapeutic interventions.

In exemplary embodiments, a system for pose and gait classification and motion prediction using spatio-temporal relationships between body joints includes an imaging device configured to capture a sequence of images or video frames of a subject performing exercise or therapy sessions and to communicate or transmit image or video files representative of the sequence of images of video frames; a therapy computing device, the therapy computing device including one or more processors, one or more memory devices, and/or computer-readable instructions stored on the one or more memory devices and executable by the one or more processors to: receive, via a network interface transceiver, the communicated or transmitted image or video files from the imaging device; apply, utilizing a pose estimation module, a neural network-based pose estimation algorithm to the communicated or transmitted image or video files to detect landmark positions of one or more anatomical joints; construct, via a spatio-temporal graph construction module, a spatio-temporal graph from the detected landmark positions of the one or more anatomical joints, wherein nodes of the spatio-temporal graph correspond to one or more anatomical joints and the landmark positions, spatial edges of the spatio-temporal graph represent anatomical connections between the one or more anatomical joints within a single image or frame, and temporal edges of the spatio-temporal graph connect the one or more anatomical joints across successive images or frames of the received image or video files; input, via a ST-GCN training module, the constructed spatio-temporal graph into a spatio-temporal graph convolutional network (ST-GCN) to classify pose and gait patterns and predict motion or stability states for the constructed spatio-temporal graph; and enhancing the ST-GCN, utilizing a spatio-temporal attention module to emphasize the one or more relevant joints and a temporal attention module to emphasize critical timeframes. In exemplary embodiments, the system further includes one or more surface electromyography (EMG) sensors configured to receive muscle activation parameters recorded during the physical therapy or exercise sessions; and a data fusion module, configured to incorporate the muscle activation parameters into the constructed spatio-terminal graph that is input into the ST-GCN.

In exemplary embodiments, the system further includes one or more inertial measurement units (IMUs) configured to capture three-dimensional movement data or parameters and transmit the captured three-dimensional movement data or parameters; and a data fusion module, configured to incorporate the captured three-dimensional movement data or parameters into the constructed spatio-terminal graph that is input into the ST-GCN. In exemplary embodiments, the computer-readable instructions executable by the one or more processors of the medical or therapy computing device to apply, utilizing the pose estimation module, a neural network-based pose estimation algorithm to additional communicated image or video files of the subject during additional exercise or therapy sessions to detect landmark positions of one or more anatomical joints; construct, via the spatio-temporal graph construction module, additional spatio-temporal graphs for the additional exercise or therapy sessions from the detected landmark positions of the one or more anatomical joints; input, via the ST-GCN training module, the constructed additional spatio-temporal graphs into additional spatio-temporal graph convolutional networks (additional ST-GCNs) to classify pose and gait patterns and predict motion or stability states for each of the constructed spatio-temporal graphs; and generate a composite stratified ST-GCN model, via the ST-GCN training module, wherein higher-level spatio-temporal graph convolutional neural networks (ST-GNNs) is trained on the additional ST-GCNs from the additional exercise or therapy sessions, where the additional exercise or therapy sessions are spaced apart by days, weeks, months, or years from the exercise or therapy examination session.

In exemplary embodiments, the composite stratified ST-GCN model include a fast time scale ST-GCNs configured to capture intra-session temporal patterns by learning from the sequence of images or video frames from the exercise or therapy session, anda slow time scale ST-GCN configured to capture inter-session temporal patterns by learning from the pose or gait pattern measurements across the additional exercise or therapy examination sessions of the subject, such that the composite trained stratified ST-GCN model encodes both short-term or intra-session motion and long-term functional or aging-related changes in the pose or gait patterns, including comparisons before and after surgery performed on the subject, across therapy milestones for the subject, or throughout the lifespan of the subject. In exemplary embodiments, a stratified multi-layer spatio-temporal graph convolutional network (ST-GCN) comprises a stratified structure with three distinct layers a first layer (fast time or intra-session) configured to embed and represent short-term gait and pose characteristics captured during the exercise or therapy sessions of the subject into distinct spatiotemporal graph convolution networks; a second layer (low time or inter-session) configured to integrate and analyze spatio-temporal embeddings from multiple examination, training or therapy sessions of the subject, thereby capturing longitudinal gait and pose changes during rehabilitation, athletic training, or across the subject's lifespan; and a third layer (Population level) configured to aggregate and analyze longitudinal gait and pose changes across a population of subjects, wherein the population of subjects is further stratified into subgroups based on criteria selected from age, ethnicity, height, weight, or geographic region, which results in personalized benchmarking, population-level comparative analyses, predictive modeling, and/or recommendations for targeted therapeutic interventions.

As detailed above, the computing devices and systems described and/or illustrated herein broadly represent any type or form of computing device or system capable of executing computer-readable instructions, such as those contained within the modules described herein. In their most basic configuration, these computing device(s) may each comprise at least one memory device and at least one physical processor.

The term "memory" or "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices comprise, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "processor" or "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors comprise, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step. In addition, one or more of the devices described herein may transform data, physical devices, and/or representations of physical devices from one form to another. For example, one or more of the devices recited herein may receive image data of a sample to be transformed, transform the image data, output a result of the transformation to determine a 3D process, use the result of the transformation to perform the 3D process, and store the result of the transformation to produce an output image of the sample. Additionally or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media comprise, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and shall have the same meaning as the word "comprising."

The processor as disclosed herein can be configured with instructions to perform any one or more steps of any method as disclosed herein.

As used herein, the term "or" is used inclusively to refer items in the alternative and in combination.

As used herein, characters such as numerals refer to like elements.

Embodiments of the present disclosure have been shown and described as set forth herein and are provided by way of example only. One of ordinary skill in the art will recognize numerous adaptations, changes, variations and substitutions without departing from the scope of the present disclosure. Several alternatives and combinations of the embodiments disclosed herein may be utilized without departing from the scope of the present disclosure and the inventions disclosed herein. Therefore, the scope of the presently disclosed inventions shall be defined solely by the scope of the appended claims and the equivalents thereof.

What is claimed is:

1. A method for pose and gait classification and motion prediction using spatio-temporal relationships between body joints, the method comprising:
- capturing a sequence of images or video frames of a subject;
- applying a neural network-based pose estimation algorithm to the sequence of images or video frames to detect landmark positions of one or more anatomical joints;
- constructing a spatio-temporal graph from the detected landmark positions of the one or more anatomical joints, wherein:
  - nodes of the spatio-temporal graph correspond to the one or more anatomical joints and the landmark positions,
  - spatial edges of the spatio-temporal graph represent anatomical connections between the one or more anatomical joints within a single image or frame, and
  - temporal edges connect the one or more anatomical joints across successive images or frames of the sequence of images or video frames; and
- inputting the constructed spatio-temporal graph into a spatio-temporal graph convolutional network (ST-GCN) to classify pose and gait patterns and predict motion or stability states for the constructed spatio-temporal graph; and
- optionally enhancing the ST-GCN with a spatio-temporal attention module to emphasize the one or more relevant anatomical joints and a temporal attention module to emphasize critical timeframes.

2. The method of claim 1, further comprising a composite stratified ST-GCN model where a higher-level spatio-temporal graph convolutional neural network (ST-GNN) model is trained on multiple additional ST-GCNs from multiple additional longitudinal examination sessions and where the multiple additional longitudinal examination sessions are spaced apart by days, weeks, months, or years from an initial examination session, wherein the composite stratified ST-GCN model includes:
- a fast time scale ST-GCN configured to capture intra-session temporal patterns by learning from the sequence of images or video frames within the initial examination session, and
- a slow time scale ST-GCN configured to capture inter-session temporal patterns by learning from the pose or gait patterns across the multiple additional longitudinal examination sessions,
- such that the composite trained stratified ST-GCN model encodes both short-term or intra-session motion and long-term functional or aging-related changes in the pose or gait patterns, including comparisons before and after surgery performed on the subject, across therapy milestones for the subject, or throughout the lifespan of the subject.

3. The method of claim 1, further comprising incorporating sensor data from one or more wearable devices captured from inertial measurement units (IMUs) and surface electromyography (EMG) sensors, wherein the sensor data is fused with the constructed spatio-temporal graph input to the ST-GCN.

4. The method of claim 1, wherein the spatio-temporal graph further comprises one or more attributed nodes and one or more attributed edges, wherein:
- each attributed node of the one or more attributed nodes includes one or more time-dependent attributes selected from joint coordinates, internal measurement units (IMU) data (joint velocity, joint acceleration, or joint angles) or surface electromyography (EMG) signals;
- each attributed edge includes one or more attributes selected from inter-joint distances, bone orientation vectors, relative angles, joint displacement across the sequence of images or video frames, or biomechanical symmetry metrics; and wherein node and edge time-dependent attributes vary over time to represent a non-static and non-stationary nature of human gait, allowing the ST-GCN to learn both short-term kinematic changes and long-term biomechanical trends.

5. The method of claim 1, further comprising training the ST-GCN on training video sequences labeled with corresponding gait types selected from Functional Movement Screening (FMS) tests including deep squat, hurdle step, in-line lunge, shoulder mobility, active straight leg raise, trunk stability push-up, or rotary stability.

6. The method of claim 1, further comprising training the ST-GCN on training video sequences and sensor data from an athlete or an exemplary healthy individual, in the appropriate age group, against which the subject can be scored based on a subject's exercise and therapy session, and utilization of the ST-GCN trained on the training video sequences and sensor data from the athlete or the exemplary health individual, to identify movement deficits of the subject, such as limited range of motion, poor stability, or asymmetries, that could hinder performance or increase injury risk for the subject and for rehabilitation planning for the subject.

7. The method of claim 1, wherein the ST-GCN is configured to predict future motion states, to identify abnormal gait patterns, or to perform Fall Risk Assessment (FRA).

8. The method of claim 1, further comprising providing real-time feedback to the subject via communication from a therapy computing device to a computing device, when the subject is undergoing physical therapy or athletic training, based on the classified pose and gait patterns or the predicted motion or stability states generated by the ST-GCN.

9. The method of claim 1, wherein an output of the ST-GCN is used for biometric identification of subjects based on the classified pose and gait patterns for the subject.

10. The method of claim 1, further comprising storing the classified pose and gait patterns of the subject in one or more memory device devices of a therapy computing device which is a subject's personal gait model; and
- comparing a subject's prior personal gait model, prior to a medical intervention, to the subject's personal gait model, which is a post-intervention model, to evaluate recovery progress or therapy effectiveness, and to assist in rehabilitation planning for the subject.

11. The method of claim 1, further comprising storing the classified pose and gait patterns of the subject (which is the subject's personal gait model) for a specified point in the subject's life; which may be referred to as a gait digital twin frozen in time; and
- comparing the gait digital twin for the specified point in the subject's life with additional gait digital twins for associated additional points in the subject's life generated utilizing the steps of claim 1, to assess and score a rate of aging and frailty for the subject.

12. The method of claim 1, wherein the spatio-temporal graph convolutional network (ST-GCN) comprises a stratified structure with three distinct layers:
- a first layer (Fast time or intra-session) configured to embed and represent short-term gait and pose characteristics captured during examination, training, or therapy sessions of the subject into distinct spatiotemporal graph neural networks;

a second layer (Slow time or inter-session) configured to integrate and analyze spatio-temporal embeddings from multiple examinations, training or therapy sessions of the subject, thereby capturing longitudinal gait and pose changes during rehabilitation, athletic training, or across the subject's lifespan; and a third layer (Population level) configured to aggregate and analyze longitudinal gait and pose changes across a population of subjects, wherein the population of subjects is stratified into subgroups based on criteria selected from age, ethnicity, height, weight, or geographic region, which results in personalized benchmarking, population-level comparative analyses, predictive modeling, and recommendations for targeted therapeutic interventions.

13. A system for pose and gait classification and motion prediction using spatio-temporal relationships between body joints, the system comprising:

an imaging device configured to capture a sequence of images or video frames of a subject performing exercise or therapy sessions and to communicate or transmit image or video files representative of the sequence of images of video frames;

a therapy computing device, the therapy computing device including one or more processors, one or more memory devices, and/or computer-readable instructions stored on the one or more memory devices and executable by the one or more processors to:

receive, via a network interface transceiver, the communicated or transmitted image or video files from the imaging device;

apply, utilizing a pose estimation module, a neural network-based pose estimation algorithm to the communicated or transmitted image or video files to detect landmark positions of one or more anatomical joints;

construct, via a spatio-temporal graph construction module, a spatio-temporal graph from the detected landmark positions of the one or more anatomical joints, wherein nodes of the spatio-temporal graph correspond to the one or more anatomical joints and the landmark positions, spatial edges of the spatio-temporal graph represent anatomical connections between the one or more anatomical joints within a single image or frame, and temporal edges of the spatio-temporal graph connect the one or more anatomical joints across successive images or frames of the received image or video files;

input, via a ST-GCN training module, the constructed spatio-temporal graph into a spatio-temporal graph convolutional network (ST-GCN) to classify pose and gait patterns and predict motion or stability states for the constructed spatio-temporal graph; and enhancing the ST-GCN, utilizing a spatio-temporal attention module to emphasize the one or more relevant anatomical joints and a temporal attention module to emphasize critical timeframes.

14. The system of claim 13, further comprising:
one or more surface electromyography (EMG) sensors configured to receive muscle activation parameters recorded during the physical therapy or exercise sessions; and
a data fusion module, configured to incorporate the muscle activation parameters into the constructed spatio-terminal graph that is input into the ST-GCN.

15. The system of claim 13, further comprising:
one or more inertial measurement units (IMUs) configured to capture three-dimensional movement data or parameters and transmit the captured three-dimensional movement data or parameters; and
a data fusion module, configured to incorporate the captured three-dimensional movement data or parameters into the constructed spatio-terminal graph that is input into the ST-GCN.

16. The system of claim 13, the computer-readable instructions executable by the one or more processors of the therapy computing device to:

apply, utilizing the pose estimation module, a neural network-based pose estimation algorithm to additional communicated image or video files of the subject during additional exercise or therapy sessions to detect landmark positions of the one or more anatomical joints;

construct, via the spatio-temporal graph construction module, additional spatio-temporal graphs for the additional exercise or therapy sessions from the detected landmark positions of the one or more anatomical joints;

input, via the ST-GCN training module, the constructed additional spatio-temporal graphs into additional spatio-temporal graph convolutional networks (additional ST-GCNs) to classify pose and gait patterns and predict motion or stability states for each of the constructed additional spatio-temporal graphs; and generate a composite stratified ST-GCN model, via the ST-GCN training module, wherein higher-level spatio-temporal graph convolutional neural networks (ST-GNNs) are trained on the additional ST-GCNs from the additional exercise or therapy sessions, where the additional exercise or therapy sessions are spaced apart by days, weeks, months, or years from a first exercise or therapy examination session.

17. The system of claim 16, wherein the composite stratified ST-GCN model includes:

fast time scale ST-GCNs configured to capture intra-session temporal patterns by learning from the sequence of images or video frames from the exercise or therapy sessions, and a slow time scale ST-GCN configured to capture inter-session temporal patterns by learning from the pose or gait patterns across the additional exercise or therapy examination sessions of the subject, such that the composite trained stratified ST-GCN model encodes both short-term or intra-session motion and long-term functional or aging-related changes in the pose or gait patterns, including comparisons before and after surgery performed on the subject, across therapy milestones for the subject, or throughout the lifespan of the subject.

18. The system of claim 13, wherein a stratified multi-layer spatio-temporal graph convolutional network (ST-GCN) comprises a stratified structure with three distinct layers:

a first layer (fast time or intra-session) configured to embed and represent short-term gait and pose characteristics captured during the exercise or therapy sessions of the subject into distinct spatiotemporal graph convolution networks;

a second layer (low time or inter-session) configured to integrate and analyze spatio-temporal embeddings from multiple examination, training or therapy sessions of the subject, thereby capturing longitudinal gait and pose changes during rehabilitation, athletic training, or across the subject's lifespan; and a third layer (Population level) configured to aggregate and analyze longitudinal gait and pose changes across a population of subjects, wherein the population of subjects is further stratified into subgroups based on criteria selected from age, ethnicity, height, weight, or geographic region, which results in personalized benchmarking, population-level comparative analyses, predictive modeling, and recommendations for targeted therapeutic interventions.

19. The method of claim 3, wherein the sensor data is also input as part of the constructed spatio-temporal graph that is input into the ST-GCN to classify the pose and gait patterns and the predicted motion or stability states for the constructed spatio-temporal graph, the pose and gait patterns and the predicted motion or stability states are communicated to an exoskeleton device and the exoskeleton device dynamically adjusts device parameters based on the received pose and gait pattens and the predicted motion or stability states, wherein the adjustments to the exoskeleton device parameters include modulating joint torque, stiffness or support profiles to assist a user during movement, thereby allowing adaptive, personalized assistance for rehabilitation, fall prevision or movement enhancements.

* * * * *